(12) United States Patent
Valentin

(10) Patent No.: US 10,083,227 B2
(45) Date of Patent: Sep. 25, 2018

(54) ON-THE-FLY DETERMINATION OF SEARCH AREAS AND QUERIES FOR DATABASE SEARCHES

(71) Applicant: Marco Valentin, Malsch (DE)

(72) Inventor: Marco Valentin, Malsch (DE)

(73) Assignee: SAP SE, Walldorf (DE)

( * ) Notice: Subject to any disclaimer, the term of this patent is extended or adjusted under 35 U.S.C. 154(b) by 379 days.

(21) Appl. No.: 14/459,183

(22) Filed: Aug. 13, 2014

(65) Prior Publication Data
US 2016/0048584 A1 Feb. 18, 2016

(51) Int. Cl.
*G06F 17/30* (2006.01)

(52) U.S. Cl.
CPC .. *G06F 17/30675* (2013.01); *G06F 17/30389* (2013.01); *G06F 17/30637* (2013.01)

(58) Field of Classification Search
None
See application file for complete search history.

(56) References Cited

U.S. PATENT DOCUMENTS

| | | | | |
|---|---|---|---|---|
| 5,761,656 A | * | 6/1998 | Ben-Shachar | ...... G06F 17/3056 |
| 2004/0172237 A1 | * | 9/2004 | Saldanha | ............ G06F 17/2229 704/4 |

OTHER PUBLICATIONS

Framework (SQL/Framework) Jan. 22, 2010, ISO/IEC, FCD 9075-1:2011(E), 91 pages.*
Information and Definition Schemas (SQL/Schemata) Jan. 22, 2010, ISO/IEC, FCD 9075-11:2-11(E), 299 pages.*
Codd's Rule date unknown, tutorialcup.com, https://www.tutorialcup.com/dbms/codds-rule.htm.*
Database Systems and Structures Summer 1998, Simon Fraiser University, http://www.cs.sfu.ca/CourseCentral/354/zaiane/material/notes/contents.html.*
SQL Select date unknown [verified as of Aug. 28, 2013 on archive.org], 1 keydata.com, http://www.1keydata.com/sql/sqlselect.html.*
SQL Where date unknown [verified as of Aug. 21, 2013 on archive.org, 1keydata.com, http://www.1keydata.com/sql/sqlwhere.html.*
SQL Createtable date unknown [verified as of Aug. 24, 2013 on archive.org, 1keydata.com, http://www/1keydata.com/sql.sqlcreate.html.*

(Continued)

*Primary Examiner* — Jason G Liao
(74) *Attorney, Agent, or Firm* — Klarquist Sparkman, LLP

(57) ABSTRACT

Innovations in the areas of determining search areas and queries for database searches are presented. For example, a search tool receives input for a search area for a database search. For the database search, the search tool determines one or more target tables that fit the search area input. In this way, the search tool can determine "on-the-fly" which database tables are relevant for the database search. The search tool can also receive input for a search string and construct queries for the database search in the target table(s). For a field of a table, the search tool can selectively convert a search value to a data format of the field. If the search string input includes multiple search values, the search tool can construct an OR query and/or an AND query. The search results can indicate real-time status of the database, while accounting for complex structures of database tables.

27 Claims, 28 Drawing Sheets

(56) References Cited

OTHER PUBLICATIONS

SQL Cast Function date unknown [verified as of Aug. 14, 2013 on archive.org, 1keydata.com, http://www.1keydata.com/sql/sqlcast.html.*
A Brief History of PostgreSQL date unknown, postgresql.org, https://www.postgresql.org/docs/9.3/static/history.html.*
E.16. Release 9.3 date unknown, postgresql.org, https://www.postgresql.org/docs/9.3/static/release-9-3.html.*
Appendix D. SQL Conformance date unknown, postgresql.org, https://www.postgresql.org/docs/9.2/static/features.html.*
Chapter 34: The Information Schema date unknown, postgresql.org, https://www.postgresql.org/docs/9.2/static/information-schema.html.*
Parasuraman et al., A Model for Types and Levels of Human Interaction with Automation May 2000, IEEE, vol. 30 No. 3, pp. 286-297.*
Schnell, Desktop search engine date unknown [captured by archive.org on Aug. 2, 2013], schnell-web.net, https://web.archive.org/web/20130802110138/http://ilan.schnell-web.net/prog/search/.*
Teevan et al., The Perfect Search Engine Is Not Enough: A Study in Orienteering Behavior in Directed Search Apr. 24-29, 2004, Proceedings of the SIGCHI Conference on Human Factors in Computing Systems, CHI '04, pp. 415-422.*
Global Software, Inc., "Spreadsheet Server for Use with SAP," 10pp. (downloaded from the World Wide Web on Aug. 12, 2014).
Potharaju, "ABAP Query—A Step-by-Step guide," 7 pp. (document marked Sep. 5, 2007; downloaded from the World Wide Web on Aug. 12, 2014).
SAP, "Administration," online documentation for SAP ERP, version 6.0, 22 pp. (downloaded from the World Wide Web on Aug. 13, 2014).
SAP, "Administration Guide," online documentation for SAP Netweaver Enterprise Search, version 7.2, 90 pp. (downloaded from the World Wide Web on Aug. 13, 2014).
SAP, "Appendix," online documentation for SAP ERP, version 6.0, 15 pp. (downloaded from the World Wide Web on Aug. 13, 2014).
SAP, "Appendix," online documentation for SAP Netweaver Enterprise Search, version 7.2, 60 pp. (downloaded from the World Wide Web on Aug. 13, 2014).
SAP, "Developer's Guide," online documentation for SAP Netweaver Enterprise Search, version 7.2, 21 pp. (downloaded from the World Wide Web on Aug. 13, 2014).
SAP, "Getting Started Using the Search," online documentation for SAP Netweaver Enterprise Search, version 7.2, 6 pp. (downloaded from the World Wide Web on Aug. 13, 2014).
SAP, "InfoSet Query," online documentation for SAP ERP, version 6.0, 30 pp. (downloaded from the World Wide Web on Aug. 13, 2014).
SAP, "InfoSets," online documentation for SAP ERP, version 6.0, 35 pp. (downloaded from the World Wide Web on Aug. 13, 2014).
SAP, "Introducing Sap NetWeaver Enterprise Search," online documentation for SAP Netweaver Enterprise Search, version 7.2, 12 pp. (downloaded from the World Wide Web on Aug. 13, 2014).
SAP, "Overview," online documentation for SAP ERP, version 6.0, 6 pp. (downloaded from the World Wide Web on Aug. 13, 2014).
SAP, "Queries," online documentation for SAP ERP, version 6.0, 66 pp. (downloaded from the World Wide Web on Aug. 13, 2014).
SAP, "QuickViewer," online documentation for SAP ERP, version 6.0, 21 pp. (downloaded from the World Wide Web on Aug. 13, 2014).
SAP, "SAP Query," online documentation for SAP ERP, version 6.0, 2 pp. (downloaded on Aug. 12, 2014).
SAP, "SAP Query—SQ01, Step by Step Guide," 14 pp. (Aug. 2008).

* cited by examiner software 280 implementing one or more innovations for on-the-fly determination of search areas and/or queries for database searches

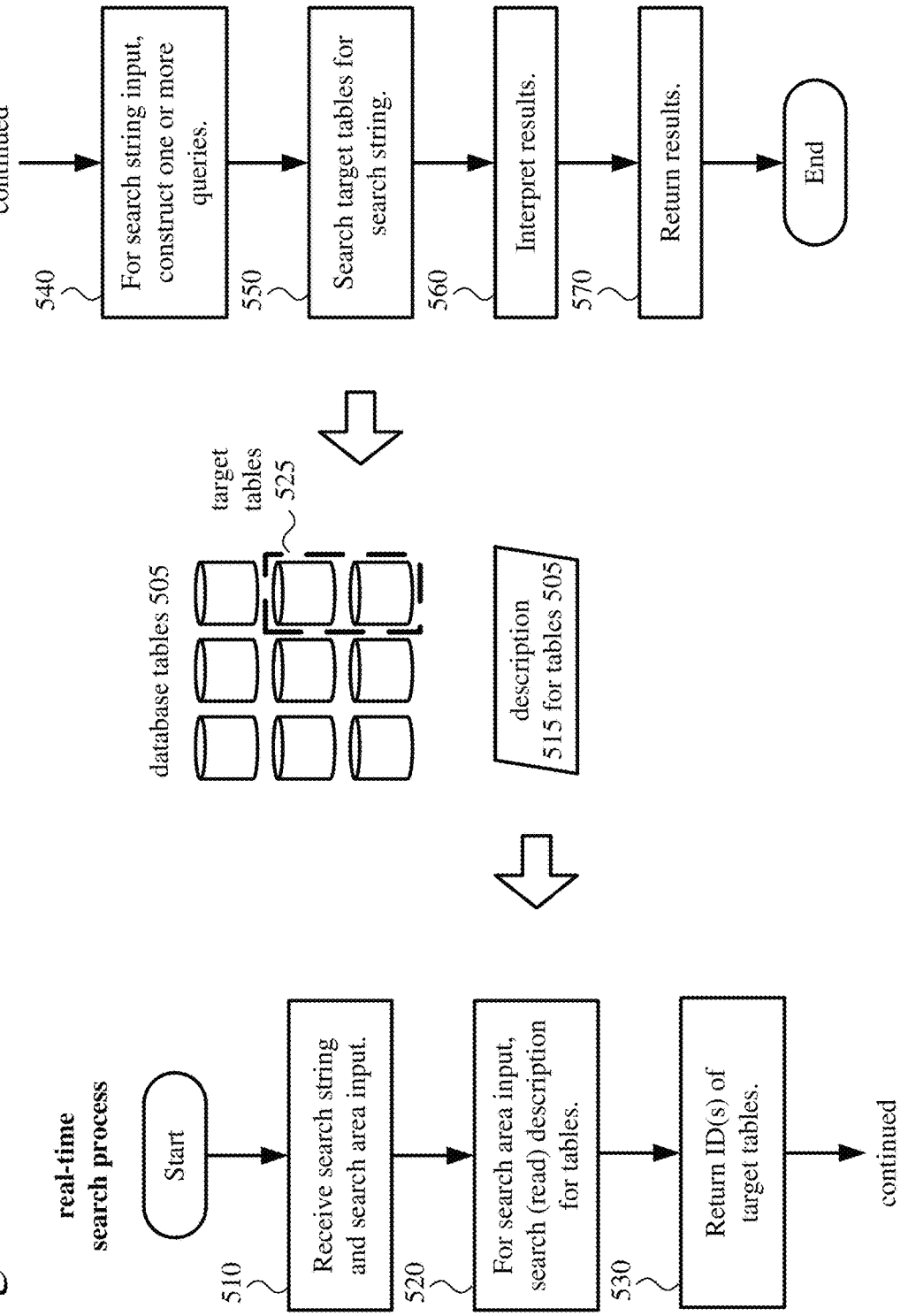

Figure 6a    601
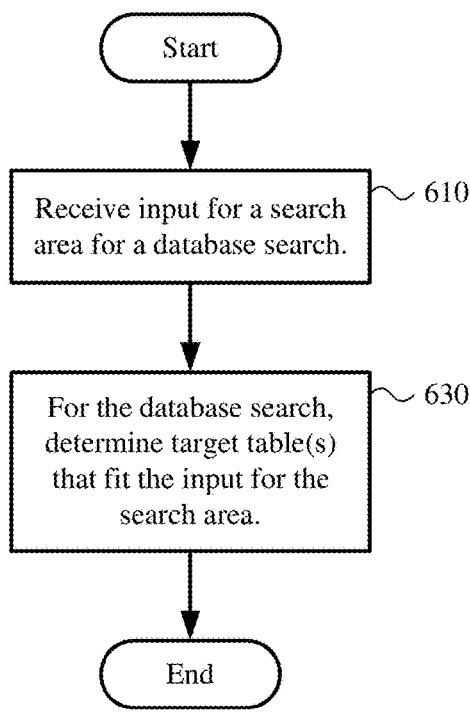
Figure 6b    602
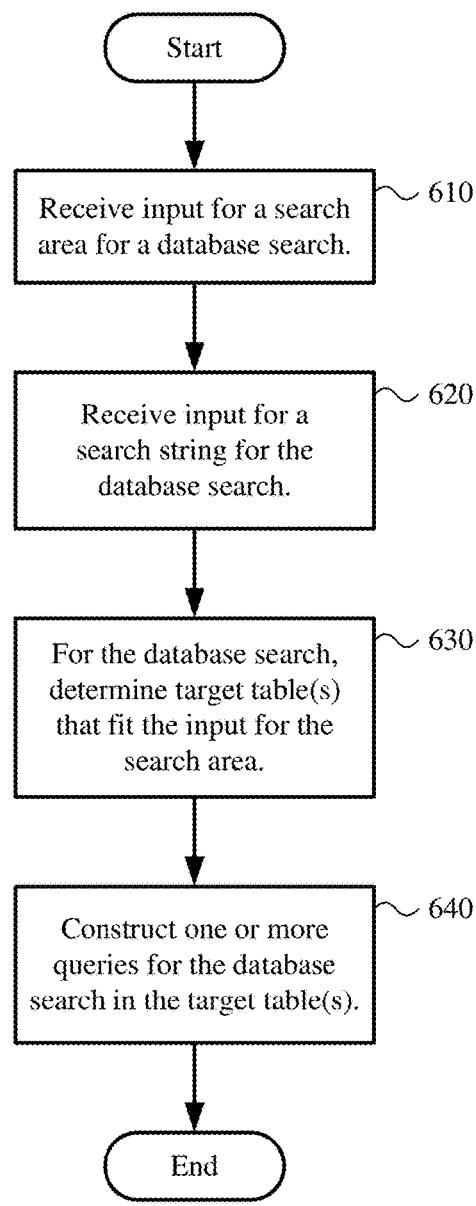

Figure 7               700

| Kind of search | ~ 710 |

⦿ Search string in search area
◯ Only determine search area

| Input of search string | ~ 720 |

Search string           [MV0001]

⦿ Linguistic search
◯ Exact search

| Definition of search area | ~ 730 |

Search area contains string   [cost center]

☑ Table name from search area
☑ Table text from search area
☐ Table field text from search area

| Display options | ~ 740 |

☐ Determine table size
☐ Only tables with hits

Figure 8
800

Search area

| | |
|---|---|
| Search string | cost center |
| Number of tables | 48 |
| Running time | 00:00:00 |

Search string

| | |
|---|---|
| Search string | MV0001 |
| Overall hits | 5 |
| Running time | 00:00:01 |

| Table name | Short description | Number of hits |
|---|---|---|
| /GLF/SKOSTL | Master Data IDs: InfoObject Cost Center | 1 |
| /PC1/SKOSTL | Master Data IDs: InfoObject Cost Center | 1 |
| CSKS | Cost Center Master Data | 1 |
| CSKT | Cost Center Text | 1 |
| ONRKS | Object NumMemIndex Cost Center | 1 |
| /BIC/SZ_KOSTL | Master Data IDs: InfoObject Cost Center | 0 |
| /GLF/HKOSTL | Hierarchy: InfoObject Cost Center | 0 |
| /GLF/IKOSTL | SID-Structure of Hierarchy: InfoObject Cost | 0 |
| /GLF/JKOSTL | Hierarchy Intervals: InfoObject Cost Center | 0 |
| /GLF/PKOSTL | Master Data: Cost Center Features | 0 |
| /GLF/TKOSTL | Text: Cost Center Features | 0 |
| . . . | | |

| Kind of search | ~ 910 |

⦿ Search string in search area
○ Only determine search area

| Input of search string | ~ 920 |

Search string | Kessler |

⦿ Linguistic search
○ Exact search

| Definition of search area | ~ 930 |

Search area contains string | UNAME |

☑ Table name from search area
☑ Table text from search area
☑ Table field text from search area

| Display options | ~ 940 |

☐ Determine table size
☐ Only tables with hits

Figure 10
1000

Search area
- Search string    UNAME
- Number of tables    1484
- Running time    00:00:00

Search string
- Search string    Kessler
- Overall hits    1225
- Running time    00:01:43

| Table name | Short description | Number of hits |
|---|---|---|
| SOTR_HEAD | Header Table for Text in OTR | 261 |
| SOTR_TEXT | Text Table in OTR | 259 |
| T100U | Final Addition Reports | 192 |
| SNAP | ABAP/4 Snapshot of Run-time Errors | 169 |
| AGR_FLAGS | Attributes of Roles | 81 |
| AGR_TIME | Timestamps to Roles | 58 |
| ... | | |
| /BA1/F4_FXRATES | Exchange Rates | 0 |
| /BA1/F4_VOLAVE | VOLA Versions | 0 |
| /BDL/MSGLOG | Message Protocol for Service Data Logs ove | 0 |
| ... | | |

```
SELECT c-tabname AS tabname, tx-ddtext AS ddtext
  APPENDING CORRESPONDING FIELDS OF TABLE $lt_tables
  FROM dd02l AS c
  LEFT OUTER JOIN dd02t AS tx ON tx-tabname = c-tabname
         WHERE ( c-tabname LIKE $ld_input AND
                 c-tabname IN $r_table )
           AND c-tabclass   = 'TRANSP'
           AND tx-ddlanguage = $sy-langu.
```

Figure 11b            1102

```
*...search for the table text
SELECT DISTINCT c-tabname AS tabname, c-ddtext AS ddtext
  APPENDING CORRESPONDING FIELDS OF TABLE $lt_tables
  FROM dd02t AS c
  INNER JOIN dd02l AS t ON t-tabname = c-tabname
                       AND t-tabclass = 'TRANSP'
  INNER JOIN tadir AS p ON p-obj_name = c-tabname
         WHERE c-tabname    IN  $r_table
           AND c-ddlanguage =   $sy-langu
           AND c-ddtext     LIKE $ld_input
           AND p-devclass   IN  $r_devcl.            "&SC_CT_SUFFIX1
```

Figure 11c            1103

```
*search for field text
SELECT DISTINCT c-tabname AS tabname, tx-ddtext AS ddtext
  APPENDING CORRESPONDING FIELDS OF TABLE $lt_tables
  FROM dd0tx AS c
  LEFT OUTER JOIN dd02t AS tx ON tx-tabname = c-tabname
  INNER JOIN dd02l AS t ON t-tabname = c-tabname
                       AND t-tabclass = 'TRANSP'
  INNER JOIN tadir AS p ON p-obj_name = c-tabname
         WHERE ( domname   LIKE $ld_input_do
              OR rollname  LIKE $ld_input_ro
              OR fieldname LIKE $ld_input_fl
              OR scrtext_s LIKE $ld_input_s
              OR scrtext_m LIKE $ld_input_m
              OR scrtext_l LIKE $ld_input_l
              OR reptext   LIKE $ld_input_r
              OR fieldtext LIKE $ld_input_f )
           AND c-ddlanguage =  $sy-langu
           AND t-tabname    IN $r_table
           AND tx-ddlanguage = $sy-langu
           AND p-devclass   IN $r_devcl.             "&SC_CT_SUFFIX1
```

Figure 11d  1104

```
LOOP AT lt_tables INTO ls_tables.
    ADD ld_perc_one TO ld_perc.
    IF ld_perc > 100.
       ld_perc = 100.
    ENDIF.
    WRITE ld_perc TO ld_text LEFT-JUSTIFIED.
    CONCATENATE ld_text '%,' text-tab '-' ls_tables-tabname
        INTO ld_text SEPARATED BY space.
    ld_tabix = sy-tabix.
    ld_table = ls_tables-tabname.
*...get all fields of table
    CALL FUNCTION 'DDIF_FIELDINFO_GET'
        EXPORTING
            tabname        = ld_table
        TABLES
            dfies_tab      = lt_dfies
        EXCEPTIONS
            not_found      = 1
            internal_error = 2
            OTHERS         = 3.

...

SELECT COUNT(*) FROM (ls_tables-tabname) INTO ls_tables-count
            WHERE (lt_where).
        ls_tables-lt_or = lt_or_selfields.
        IF ls_tables-count > 0.
           ls_tables-style = 'C1'.
           ADD ls_tables-count TO e_total_count.
        ELSE.
           CLEAR ls_tables-style.
        ENDIF.
        MODIFY lt_tables FROM ls_tables INDEX ld_tabix.
    ENDIF.
  ENDIF.
ENDLOOP.
```

Figure 12                                    1200
| Table name | Language | Version | Short description |
|---|---|---|---|
| CSKS | DE | | Kostenstellenstammsatz |
| CSKS | EN | | Cost Center Master Data |
| CSKS | FR | | Fiche centres |
| CSKS | IT | | Record anagrafico centri di costo |
| CSKS | NL | | Kostenplaatsstamrecord |
| CSKS | PT | | Registro mestre de centros de custo |
| CSKS | ES | | Registro maestro de centro de coste |
Figure 13                                    1300
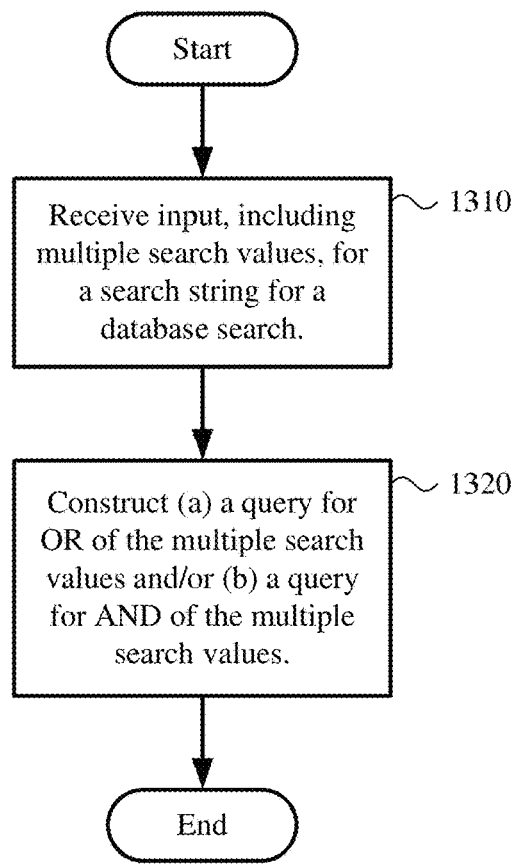

Kind of search ~ 1410
- ⦿ Search string in search area
- ○ Only determine search area

Input of search string ~ 1420

Search string  [Kessler 2014]

- ⦿ Linguistic search
- ○ Exact search

- ⦿ Min. one string (OR)
- ○ All string (AND)

Definition of search area ~ 1430

Search area contains string  [vouchers]

- ☑ Table name from search area
- ☑ Table text from search area
- ☐ Table field text from search area

Display options ~ 1440
- ☐ Determine table size
- ☐ Only tables with hits

Kind of search ~ 1710

- ◉ Search string in search area
- ○ Only determine search area

Input of search string ~ 1720

Search string [Kessler 2014]

- ◉ Linguistic search
- ○ Exact search

- ○ Min. one string (OR)
- ◉ All string (AND)

Definition of search area ~ 1730

Search area contains string [vouchers]

- ☑ Table name from search area
- ☑ Table text from search area
- ☐ Table field text from search area

Display options ~ 1740

- ☐ Determine table size
- ☐ Only tables with hits

```
LOOP AT lt_tables INTO ls_tables.
  ADD ld_perc_one TO ld_perc.
  IF ld_perc > 100.
    ld_perc = 100.
  ENDIF.
  WRITE ld_perc TO ld_text LEFT-JUSTIFIED.
  CONCATENATE ld_text '%,' text-tab '(' ls_tables-tabname
      INTO ld_text SEPARATED BY space.
  ld_tabix = sy-tabix.
  ld_table = ls_tables-tabname.
*...get all fields of table
  CALL FUNCTION 'DDIF_FIELDINFO_GET'
    EXPORTING
      tabname       = ld_table
    TABLES
      dfies_tab     = lt_dfies
    EXCEPTIONS
      not_found     = 1
      internal_error = 2
      OTHERS        = 3.
```

```
*.....character kind is never a problem
    WHEN 'C'. "e.g. CHAR, UNIT, CUKY,...
*.....check if input contains only digits
    WHEN 'N'.
      CHECK: ls_input-input CO '0123456789 '.
*.....date-field
    WHEN 'D'.
      CHECK: ls_input-input CO '0123456789 '.
      PERFORM convert_to_intern USING ls_dfies
                                CHANGING ls_input-input
                                         ld_subrc.
      IF ld_subrc <> 0.
        CONTINUE.
      ENDIF.
*.....time-field
    WHEN 'T'.
      CHECK: ls_input-input CO '0123456789 '.
      PERFORM convert_to_intern USING ls_dfies
                                CHANGING ls_input-input
                                         ld_subrc.
      IF ld_subrc <> 0.
        CONTINUE.
      ENDIF.
```

Figure 21a          2100

```
*... AND-logic means that all strings need to be in each
*... line of the table
    IF p_and_logic = true.
      SPLIT p_string AT space INTO TABLE lt_input.
      REFRESH lt_and_selfields.
      LOOP AT lt_input INTO ls_input.
        REFRESH: lt_or_selfields.
*... fill each string into selection criteria
        LOOP AT lt_dfies INTO ls_dfies
          WHERE datatype = 'CHAR' OR
                datatype = 'NUMC' OR
                datatype = 'CUKY' OR
                datatype = 'DATS' OR
                datatype = 'TIMS' OR
                datatype = 'UNIT' OR
                datatype = 'QUAN'.
          REFRESH lt_selfields.
*...... fill selection fields depending on table field and input
          PERFORM fill_selfields TABLES lt_selfields
                                 USING  ls_dfies
                                        ls_input-input
                                        p_exact_logic.
          CLEAR ls_or_selfields.
          IF NOT lt_selfields[] IS INITIAL.
            APPEND LINES OF lt_selfields TO ls_or_selfields-seltab.
            APPEND ls_or_selfields TO lt_or_selfields.
          ENDIF.
        ENDLOOP.
        CLEAR ls_and_selfields.
        IF NOT lt_or_selfields[] IS INITIAL.
          APPEND lt_or_selfields TO lt_and_selfields.
        ENDIF.
      ENDLOOP.
```

```
*.now search for this table
    IF NOT lt_and_selfields[] IS INITIAL.
      CALL FUNCTION 'SAPGUI_PROGRESS_INDICATOR'
        EXPORTING
          percentage = ld_perc
          text       = ld_text.
      REFRESH lt_where.
      CALL FUNCTION 'SE16N_CREATE_AND_SELTAB'
        EXPORTING
          i_pool     = space
        TABLES
          et_where   = lt_where
        CHANGING
          it_and_seltab = lt_and_selfields.
      SELECT COUNT(*) FROM (ls_tables-tabname) INTO ls_tables-count
             WHERE (lt_where).
      ls_tables-lt_and = lt_and_selfields.
      IF ls_tables-count > 0.
        ls_tables-style = 'C1'.
        ADD ls_tables-count TO e_total_count.
      ELSE.
        CLEAR ls_tables-style.
      ENDIF.
      MODIFY lt_tables FROM ls_tables INDEX ld_tabix.
    ENDIF.
```

```
*...standard OR-logic, one part of the string needs to be in each line
    ELSE.
*..fill all fields into selection criteria
    REFRESH: lt_or_selfields.
    LOOP AT lt_dfies INTO ls_dfies
        WHERE datatype = 'CHAR' OR
              datatype = 'NUMC' OR
              datatype = 'CUKY' OR
              datatype = 'DATS' OR
              datatype = 'TIMS' OR
              datatype = 'UNIT' OR
              datatype = 'QUAN'.
        REFRESH lt_selfields.
*.....fill selection fields depending on table field and input
        PERFORM fill_selfields TABLES lt_selfields
                               USING  ls_dfies
                                      p_string
                                      p_exact_logic.

CLEAR ls_or_selfields.
        IF NOT lt_selfields[] IS INITIAL.
          APPEND LINES OF lt_selfields TO ls_or_selfields-seltab.
          APPEND ls_or_selfields TO lt_or_selfields.
        ENDIF.
    ENDLOOP.
```

```
*,new search for this table
    IF NOT lt_or_selfields[] IS INITIAL.
      CALL FUNCTION 'SAPGUI_PROGRESS_INDICATOR'
        EXPORTING
          percentage = ld_perc
          text       = ld_text.
      REFRESH lt_where.
      CALL FUNCTION 'SE16N_CREATE_OR_SELTAB'
        EXPORTING
          i_pool     = space
        TABLES
          it_or_seltab = lt_or_selfields
          et_where     = lt_where.
      SELECT COUNT(*) FROM (ls_tables-tabname) INTO ls_tables-count
             WHERE (lt_where).
      ls_tables-lt_or = lt_or_selfields.
      IF ls_tables-count > 0.
        ls_tables-style = 'C1'.
        ADD ls_tables-count TO e_total_count.
      ELSE.
        CLEAR ls_tables-style.
      ENDIF.
      MODIFY lt_tables FROM ls_tables INDEX ld_tabix.
    ENDIF.
  ENDIF.
```

| Enter Search Terms | |
|---|---|
| Field Description 1 | Object number |
| Search Value 1 | KS0001MV0001 |
| Field Description 2 | Cost element |
| Search Value 2 | 400001 |
| Field Description 3 | Fiscal year |
| Search Value 3 | 2014 |
| Field Description 4 | Business transaction |
| Search Value 4 | RKIV |

2310

| Table name | Short description | Hits | No. Suit. Entries |
|---|---|---|---|
| COEP | CO Object: Line Items (by period) | 2550 | 4 |
| COSS | CO Object: Cost Totals for Internal Postings | 50 | 4 |
| COKA | CO Object: Control Data for Cost Elements | 1 | 3 |
| COBK | CO Object: Document Header | 174 | 2 |
| FIEUD FIDOC 1 | SAFT: FI Transaction Document Item | 1109 | 1 |
| BSET | Tax Data Document Segment | 600 | 1 |
| BSIS | Accounting: Secondary Index for G/L Accounts | 468 | 1 |

Figure 24a            2401

```
SELECT
*
FROM COEP
up to <max_lines> rows
into corresponding fields of table <target>
bypassing buffer
WHERE
(
    ( GJAHR            EQ '2014' )
AND ( KSTAR            EQ '0000400001' )
AND ( USPOB            EQ 'KS0001MV0001' )
AND ( VRGNG            EQ 'RKIV' )
) or (
    ( GJAHR            EQ '2014' )
AND ( KSTAR            EQ '0000400001' )
AND ( OBJNR_N3         EQ 'KS0001MV0001' )
AND ( VRGNG            EQ 'RKIV' )
) or (
    ( GJAHR            EQ '2014' )
AND ( KSTAR            EQ '0000400001' )
AND ( OBJNR            EQ 'KS0001MV0001' )
AND ( VRGNG            EQ 'RKIV' )
) or (
    ( GJAHR            EQ '2014' )
AND ( KSTAR            EQ '0000400001' )
AND ( OBJNR_N1         EQ 'KS0001MV0001' )
AND ( VRGNG            EQ 'RKIV' )
) or (
    ( GJAHR            EQ '2014' )
AND ( KSTAR            EQ '0000400001' )
AND ( OBJNR_HK         EQ 'KS0001MV0001' )
AND ( VRGNG            EQ 'RKIV' )
) or (
    ( GJAHR            EQ '2014' )
AND ( KSTAR            EQ '0000400001' )
AND ( PAROB1           EQ 'KS0001MV0001' )
AND ( VRGNG            EQ 'RKIV' )
) or (
    ( GJAHR            EQ '2014' )
AND ( KSTAR            EQ '0000400001' )
AND ( PAROB            EQ 'KS0001MV0001' )
AND ( VRGNG            EQ 'RKIV' )
) or (
    ( GJAHR            EQ '2014' )
AND ( KSTAR            EQ '0000400001' )
AND ( OBJNR_N2         EQ 'KS0001MV0001' )
AND ( VRGNG            EQ 'RKIV' )
)
```

Figure 24b          2402

```
SELECT
*
FROM COKA
up to <max_lines> rows
into corresponding fields of table <target>
bypassing buffer
WHERE
     ( GJAHR                        EQ '2014' )
 AND ( KSTAR                        EQ '0000400001' )
 AND ( OBJNR                        EQ 'KS0001MU0001' )
```

Figure 24c          2403

```
SELECT
*
FROM FIELD_FIDOC_1
up to <max_lines> rows
into corresponding fields of table <target>
bypassing buffer
WHERE
    ( GJAHR                         EQ '2014' )
```

Figure 25a     2501

| No. | Component name | T. | Lngth | Contents |
|---|---|---|---|---|
| 1 | TABNAME | C | 30 | COEP |
| 2 | DDTEXT | C | 60 | CO Object: Line Items (by Perio |
| 3 | COUNT | P | 16 | 0 |
| 4 | COUNT_ALL | P | 16 | 0 |
| 5 | LT_OR | h | 8 | Table[8x16] |
| 6 | LT_AND | h | 8 | Table[initial] |
| 7 | LT_SEL | h | 8 | Table[initial] |
| 8 | STYLE | C | 1 | |
| 9 | NO_AUTHORITY | C | 1 | |
| 10 | ERROR | C | 1 | |
| 11 | ENTITY_NR | P | 16 | 4 |
| 12 | ENTITY_NAME | h | 8 | Table[4x60] |

Figure 25b     2502

Internal table: et_tables[90]-LT_OR

| | POS SELTAB |
|---|---|
| 1 | 000|Table[4x594] |
| 2 | 000|Table[4x594] |
| 3 | 000|Table[4x594] |
| 4 | 000|Table[4x594] |
| 5 | 000|Table[4x594] |
| 6 | 000|Table[4x594] |
| 7 | 000|Table[4x594] |
| 8 | 000|Table[4x594] |

Figure 25c     2503

Internal table: et_tables[90]-LT_OR[1]-SELTAB    Type S

| | FIELD | SIGN | OPTION | LOW |
|---|---|---|---|---|
| 1 | USPOB | | | KS0001H00001 |
| 2 | KSTAR | | | 0000400001 |
| 3 | GJAHR | | | 2014 |
| 4 | VRGNG | | | RKIU |

ON-THE-FLY DETERMINATION OF SEARCH AREAS AND QUERIES FOR DATABASE SEARCHES

FIELD

Approaches to determining search areas and queries for database searches.

BACKGROUND

In general, a database is an organized collection of data. A relational database, conceptually, can be organized as one or more tables, where a table is a two-dimensional structure with data values organized in rows and columns. A database management system ("DBMS") mediates interactions between a database, users and applications in order to organize, create, update, capture, analyze and otherwise manage the data in the database.

An enterprise resource planning ("ERP") system is a set of business management tools, such as a suite of integrated software applications, that a company uses to collect, store, manage and interpret data from various business activities. The business activities can include product planning, cost tracking and development, manufacturing, service delivery, marketing, sales, inventory management, shipping and payment tracking. In many cases, an ERP system contains huge amounts of data, which can be spread across relational database tables accessed and updated at different times by various departments (e.g., manufacturing, purchasing, sales, accounting, and so on). Tables may contain fields in different formats, e.g., date formats (such as MMDDYY, MMDDYYYY or DDMMYY), time formats (such as HH:MM:SS or HH:MM), formats for strings of text characters (such as leading zeros, lower case only or upper case only), number formats (such as integer or floating point), and so on. A conversion routine (also called a conversion exit) can be used to convert values between a given format used in a database table and another format used for input or presentation.

Typically, an ERP system provides status information for data in database tables. The database tables are accessed through a DBMS, which executes searches for specified data in the database tables. For example, an ERP system can be used to track the status of business resources or commitments. Several different approaches have been used to retrieve relevant data from database tables in an ERP system.

According to one approach, a search engine included in or accessed by the DBMS creates an index file for the data values in the database tables of the ERP system. FIG. 1 illustrates an example search process (100) using an index file (125) for database tables (105). The search process (100) includes a stage in which the index file (125) is constructed and a stage in which searches are performed using the index file (125).

The index file (125) is constructed from database tables (105) that may contain relevant data values for searches. The search engine reads the database tables (105), creates (110) the index file (125) from the database tables (105), and then stores (120) the index file (125) in storage or memory for use in database searches. When constructing the index file (125), the search engine "flattens" the information from the database tables (105) into a text file or similar file for the index file (125). As part of this process, the search engine converts data values in different formats to a common format for the index file (125) (e.g., a character format used by all data values, regardless of their format in the underlying database tables). The index file (125) has a simple structure and can be reviewed quickly during subsequent string search operations, since all data values in the index file (125) have the same format. From time to time, the search engine decides (130) whether to update the index file (125). The search engine can update the index file every 10 minutes, every hour, etc.

When a user enters a search string for a database search, the search engine is called. The search engine receives (140) the search string. If the search string includes multiple search values, the search engine decides whether search values should be combined with an AND condition or an OR condition for the search. The search engine searches (150) (reads) the index file (125), attempting to find the search string in the index file (125) using string search operations. String search operations on the index file (125) tend to be fast and efficient, even when multiple search values are combined with an AND condition or an OR condition. The search engine (or another module) interprets (160) the results (e.g., sorting results, prioritizing results) and returns (170) the results to the requester for presentation.

While searching the index file (125) is fast, the index file (125) becomes out-of-date when the data values in the underlying database tables (105) change. Even if the index file (125) is constructed periodically (e.g., every 10 minutes, every hour), real-time status information might not be returned in search results, since the index file (125) does not reflect the actual, current status of the data in the underlying database tables (105). The results returned by the search engine can list a "hit" (according to the index file (125)) that no longer exists in the database tables. An ERP system can include several hundred thousand database tables. Constructing the index file (125) can be time-consuming, so re-compiling the index file (125) on demand (or every second, every few seconds, etc.) is not practical.

Even if the index file (125) is up-to-date, information may be lost when the index file (125) is constructed due to format conversion operations. For example, suppose a date in a DDMMYY format (e.g., 290300) for a record is converted to a character format for the index file (125). If a search value is the same date in a different format (e.g., 03292000, 032900 or Mar. 29, 2000), a record having that date may be missed. Conversion of data values to a common character format for the index file (125) can result in loss of information about the meaning of those data values. In particular, when a customer has created a database table with a custom structure, the index file (125) may poorly represent the data values in the table.

Finally, aside from problems stemming from the index file (125) being incomplete or out-of-date, when a match is found in the index file (125), the "hit" returned (170) by the search engine lacks context. Typically, the search engine indicates the database table that includes the match, but does not provide context or details about the location of the match within the database table.

According to another approach, for a given database table, a search engine uses a data browser associated with that table. The data browser can be provided, for example, by a vendor that provides or manages the database table. The data browser accounts for different formats of fields of the database table. A user enters a search string for a field of the database table, and the associated data browser searches the field of the database table for the search string, performing any necessary format conversions. If the user does not know the database table to search or field of the database table, however, the user is unable to execute the search.

In this approach, the structure of the search area is not unified. Different data browsers are used for different database tables (which often have different fields, different formats, etc.). Searches with multiple search values, in fields of different database tables or otherwise, are not supported. For example, a given data browser cannot search for multiple search values in different database tables.

SUMMARY

In summary, the detailed description presents innovations in the areas of determining search areas and queries for database searches. For example, a search tool for a database management system ("DBMS") or component of an enterprise resource planning ("ERP") system can search for an arbitrary string or combination of strings in any of a set of database tables that may contain relevant data values. In some example implementations, the search tool can retrieve real-time status information for the database tables, even when the database tables have fields with diverse formats or are updated by different entities on an ongoing basis.

According to one aspect of the innovations described herein, a search tool receives input for a search area for a database search. For the database search, the search tool determines one or more target tables that fit the input for the search area. The determination of target table(s) that fit the search area input can be based on: (1) names of multiple available database tables, (2) text descriptions of the multiple available database tables, and/or (3) data definitions for fields of the multiple available database tables. For example, when determining target table(s) that fit the input for the search area, for a given database table of multiple available database tables, the search tool checks whether the input for the search area (1) fits the name of the database table; (2) fits text description of the database table; and/or (3) fits, according to a data definition of the database table, any field text of fields of the database table. The data definition of the database table can indicate names and data formats of the fields, respectively, of the database table. In this way, the search tool can determine "on-the-fly" which database tables are relevant for the database search.

The search tool can also receive input for a search string for the database search, and construct one or more queries for the database search in the target table(s). The queries can incorporate exact matching criterion or linguistic matching criterion. When constructing a query, for a field of a given target table, the search tool can selectively convert a search value of the input for the search string to a data format of the field. For example, the search value of the input for the search string is converted to the data format of the field if (1) the data format of the search value is different than the data format of the field and (2) the search value can be converted to the data format of the field. Since the target table(s) in the search area are determined on-the-fly and the target table(s) themselves are searched (not an index file), the results of the database search indicate real-time status of the database. Thus, the search tool can provide searching functionality that is easy to use, but still accounts for complex structures of database tables.

The input for the search string can include multiple search values. In this case, the search tool can construct (1) a first query ("OR" query) that includes a condition satisfied if any of the multiple search values is found in a target table and/or (2) a second query ("AND" query) that includes a condition satisfied if all of the multiple search values are found in the target table. For example, the queries are SELECT statements in a structured query language. A query can be constructed in a table-specific way, such that the query accounts for the formats of fields in a target table.

The results of the database search can be output for display. When output, an occurrence of the input for the search string in a given target table can be presented in the context of surrounding details of the table. For example, the surrounding details and a link to the location of the occurrence in the table are presented.

According to another aspect of the innovations described herein, a search tool receives input for a search string for a database search, where the input for the search string includes multiple search values. The search tool constructs (1) a first query ("OR" query) that includes a condition satisfied if any of the multiple search values is found in a database table and/or (2) a second query ("AND" query) that includes a condition satisfied if all of the multiple search values are found in the database table. A query can be constructed in a table-specific way, such that the query accounts for the formats of fields in a given database table. When constructing a query, for a field of a database table, the search tool can selectively convert one or more of the search values to a data format of the field. For example, a given search value is converted to the data format of the field if (1) the data format of the given search value is different than the data format of the field and (2) the given search value can be converted to the data format of the field. The query can incorporate exact matching criterion or linguistic matching criterion.

The database table is then searched using the one or more constructed queries. The search tool can repeat the constructing for each of one or more other database tables. In this way, the search tool can search for combinations of arbitrary search values (with an AND query and/or an OR query) in arbitrary fields of any of a set of database tables.

The input for the search string can also include, for a search value, information indicating one or more fields of the database table to be searched for that search value. In this case, a constructed query can account for fields that are specified for the multiple search values.

More generally, the innovations described herein can be implemented as part of a method, as part of a computing system adapted to perform the method, or as part of a tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 5 is a diagram illustrating a search process for database tables in a search area determined on-the-fly.

FIG. 6a is a flowchart illustrating a generalized technique for determining a search area on-the-fly for a database search.

FIG. 6b is a flowchart illustrating a generalized technique for constructing queries for a database search in a search area determined on-the-fly.

FIGS. 7 and 9 are diagrams illustrating user interface screens for providing input for a search area.

FIGS. 8 and 10 are charts illustrating database tables that fit the search area input in the examples of FIGS. 7 and 9, respectively.

FIGS. 11a-11c are pseudocode listings illustrating options for finding database tables that fit input for a search area, and FIG. 11d is a pseudocode listing illustrating a database search in the search area.

FIG. 12 is a chart illustrating description text for a table in multiple languages.

FIG. 13 is a flowchart illustrating a generalized technique for constructing queries with multiple search values for a database search.

FIG. 14 is a diagram illustrating a user interface screen for providing input for a search string with multiple search values combined as an "OR" condition.

FIG. 17 is a diagram illustrating a user interface screen for providing input for a search string with multiple search values combined as an "AND" condition.

FIGS. 18a and 18b are diagrams illustrating example data structures used when creating a query for the search values of FIG. 17.

FIGS. 20, 21a-21c, 22a and 22b are pseudocode listings illustrating example instructions used when creating queries for multiple search values.

FIG. 23 is a diagram illustrating a user interface screen for providing input for a search string with multiple search values and corresponding fields to search for the search values, and a chart illustrating search results.

FIGS. 24a-24c are pseudocode listings illustrating fragments of example queries for the search values of FIG. 23.

FIGS. 25a-25c are diagrams illustrating example data structures used when creating the query of FIG. 24a.

DETAILED DESCRIPTION

The detailed description presents innovations in the areas of determining search areas and queries for database searches. For example, after determining a search area on-the-fly, a search tool can search for an arbitrary string or combination of strings in any of a set of database tables that may contain relevant data values. In some example implementations, the search tool can retrieve real-time status information for the database tables, even when the database tables have fields with diverse formats or are updated by different entities.

I. Example Computing Systems and Cloud Computing Environments.

Figure 1:
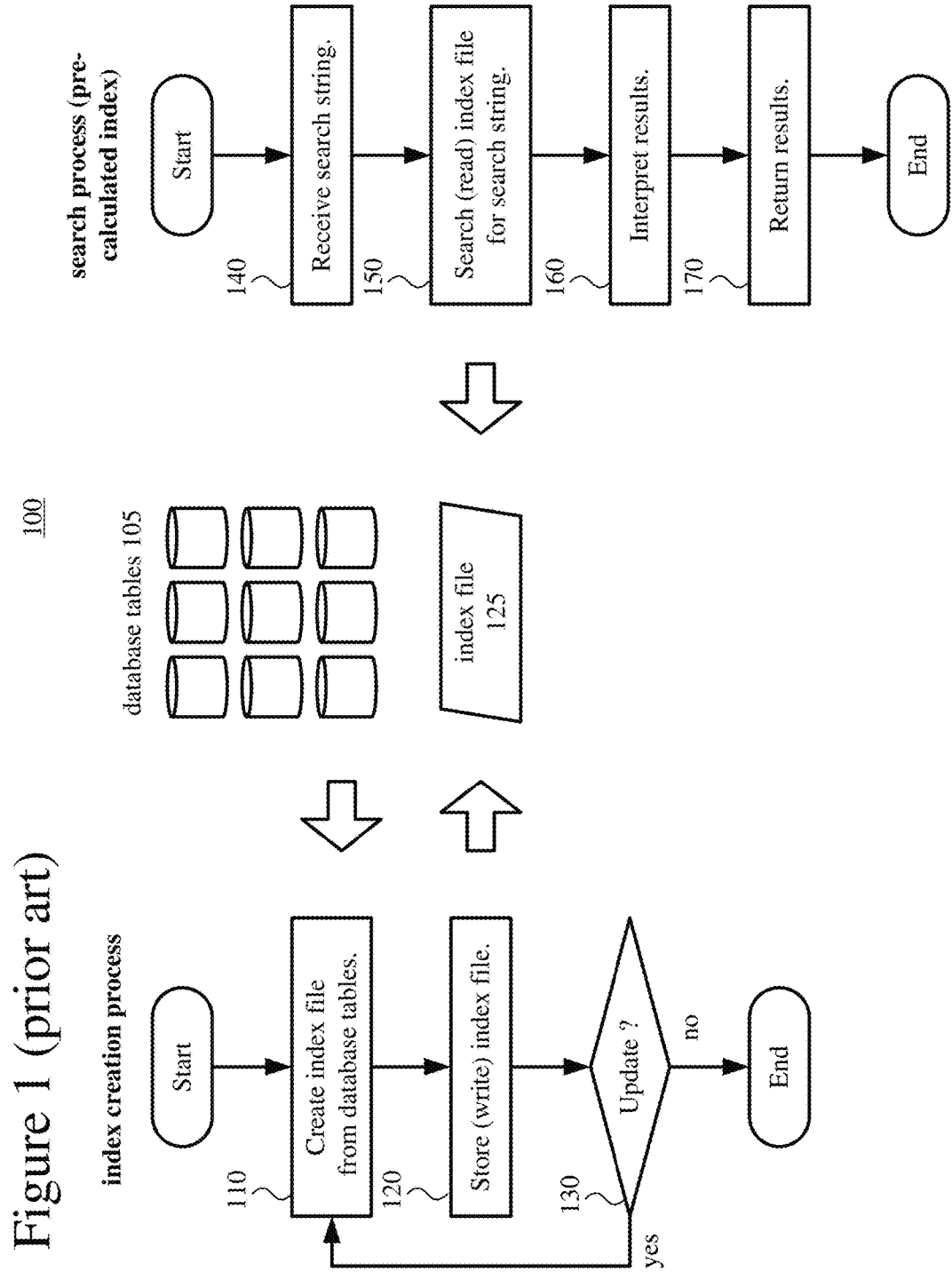
FIG. 1 is a diagram illustrating a search process using an index file for database tables according to the prior art.
Figure 2:
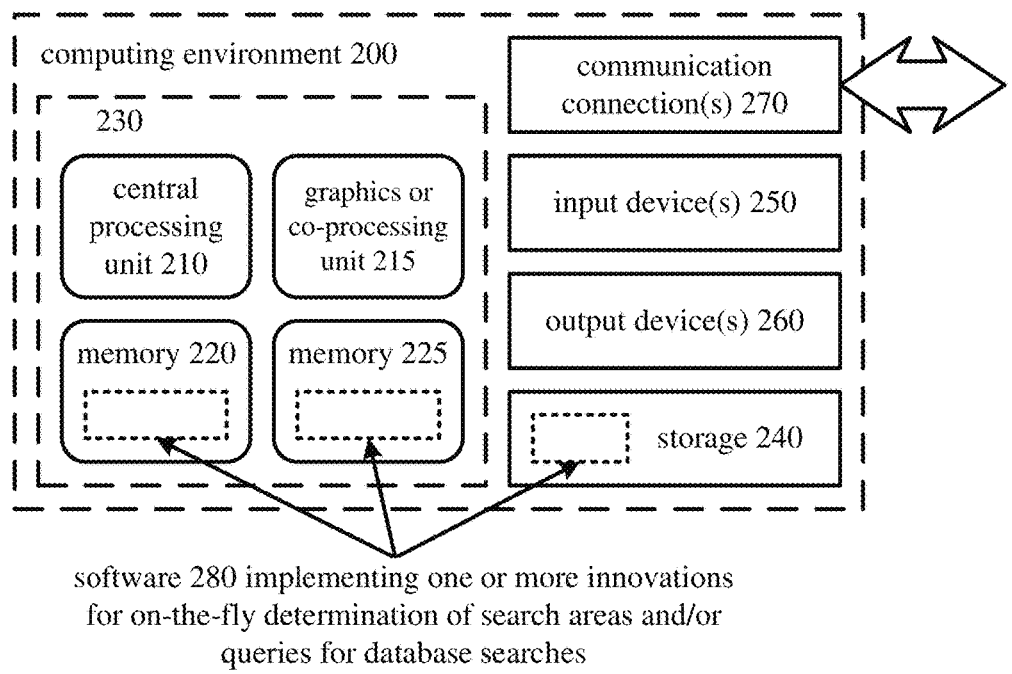
FIG. 2 is a diagram illustrating an example computing system in which some described embodiments can be implemented.

FIG. 2 depicts a generalized example of a suitable computing system (200) in which the described innovations may be implemented. The computing system (200) is not intended to suggest any limitation as to scope of use or functionality, as the innovations may be implemented in diverse computing systems, including special-purpose computing systems adapted for enterprise resource planning ("ERP") systems or searching of database tables.

With reference to FIG. 2, the computing system (200) includes one or more processing units (210, 215) and memory (220, 225). In FIG. 2, this basic configuration (230) is included within a dashed line. The processing units (210, 215) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 2 shows a CPU (210) as well as a graphics processing unit or co-processing unit (215). The tangible memory (220, 225) may be volatile memory (e.g., registers, cache, RAM), non-volatile memory (e.g., ROM, EEPROM, flash memory, etc.), or some combination of the two, accessible by the processing unit(s). The memory (220, 225) stores software (280) implementing one or more innovations for on-the-fly determination of search areas and/or queries for database searches, in the form of computer-executable instructions suitable for execution by the processing unit(s).

A computing system may have additional features. For example, the computing system (200) includes storage (240), one or more input devices (250), one or more output devices (260), and one or more communication connections (270). An interconnection mechanism (not shown) such as a bus, controller, or network interconnects the components of the computing system (200). Typically, operating system software (not shown) provides an operating environment for other software executing in the computing system (200), and coordinates activities of the components of the computing system (200).

The tangible storage (240) may be removable or non-removable, and includes magnetic disks, magnetic tapes or cassettes, CD-ROMs, DVDs, or any other medium which can be used to store information in a non-transitory way and which can be accessed within the computing system (200). The storage (240) stores instructions for the software (280) implementing one or more innovations for on-the-fly determination of search areas and/or queries for database searches.

The input device(s) (250) may be a touch input device such as a keyboard, mouse, pen, or trackball, a voice input device, a scanning device, or another device that provides input to the computing system (200). The output device(s) (260) may be a display, printer, speaker, CD-writer, or another device that provides output from the computing system (200).

The communication connection(s) (270) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 3:
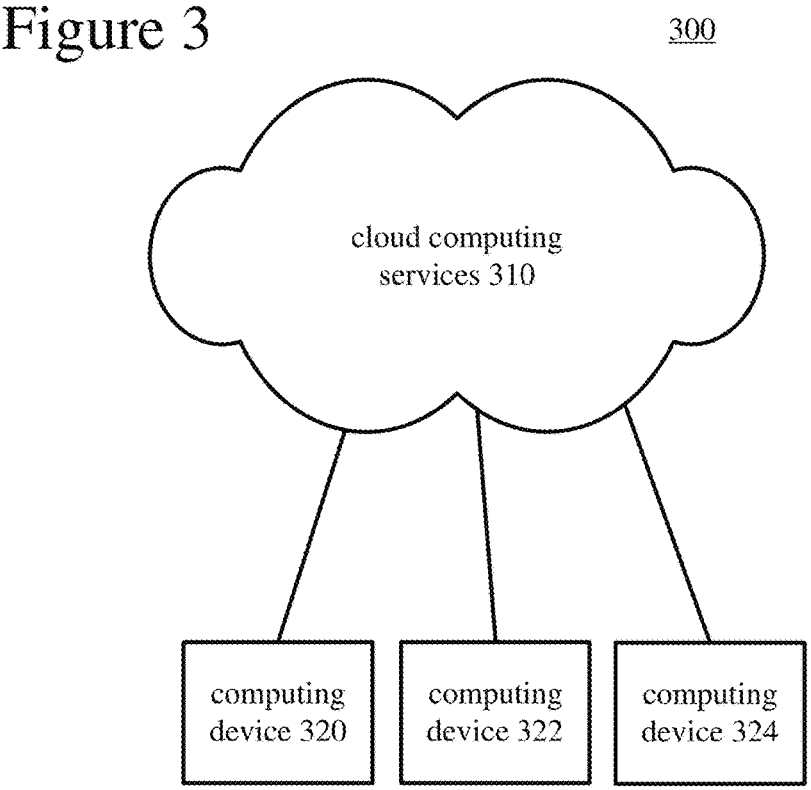
FIG. 3 is a diagram illustrating an example cloud computing environment in which some described embodiments can be implemented.

FIG. 3 depicts an example cloud computing environment (300) in which described innovations can be implemented. The cloud computing environment (300) includes cloud computing services (310). The cloud computing services (310) can include various types of cloud computing resources, such as computer servers, data storage repositories, networking resources, etc. The cloud computing services (310) can be centrally located (e.g., provided by a data center of a business or organization) or distributed (e.g., provided by various computing resources located at different locations, such as different data centers and/or located in different cities or countries).

The cloud computing services (310) are utilized by various types of computing devices (e.g., client computing devices), such as computing devices (320, 322, and 324). For example, the computing devices (e.g., 320, 322, and 324) can be computers (e.g., desktop or laptop computers), mobile devices (e.g., tablet computers or smart phones), or other types of computing devices. For example, the computing devices (e.g., 320, 322, and 324) can utilize the cloud computing services (310) to perform computing operations (e.g., query processing, and the like).

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable media and executed on a computing device (e.g., any available computing device, including smart phones or other mobile devices that include computing hardware). The computer-executable instructions may be interpreted instructions, which are converted to another form of instructions at runtime, or instructions directly executable by a processor. Computer-readable media are any available tangible media that can be accessed within a computing environment (e.g., one or more optical media discs such as DVD or CD, volatile memory components (such as DRAM or SRAM), or non-volatile memory components (such as flash memory or hard drives)). By way of example and with reference to FIG. 2, computer-readable media include memory (220 and 225) and storage (240). The term computer-readable media does not include signals and carrier waves. In addition, the term computer-readable media does not include communication connections (e.g., 270).

The innovations can be described in the general context of computer-executable instructions, such as those included in program modules (hereinafter, "modules"), being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Database queries can be written in SQL or another query language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

II. Example Network Environments for Query Processing.

Figure 4:
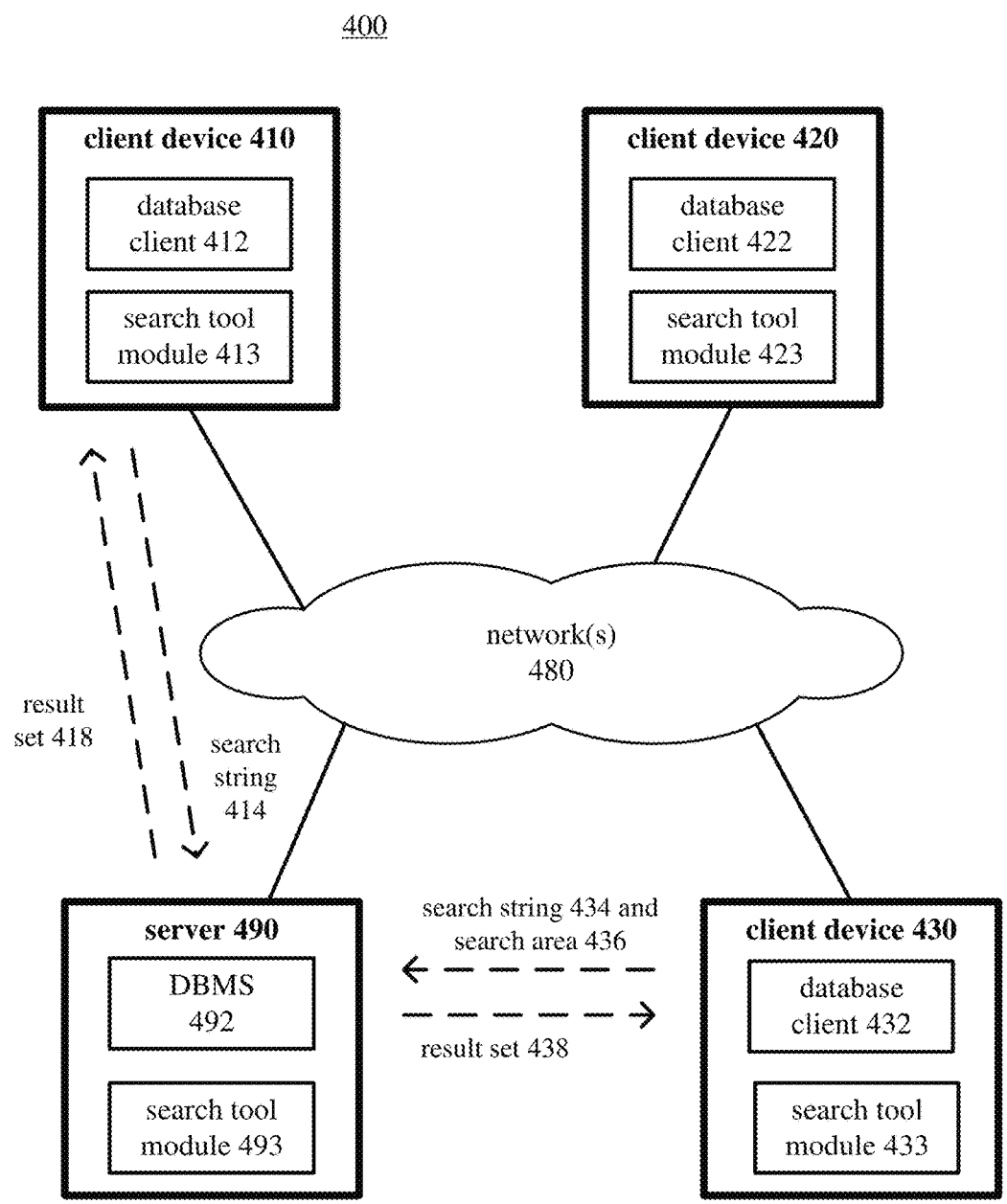
FIG. 4 is a diagram illustrating an example network environment that includes a server and client devices that interact for query processing.

FIG. 4 illustrates an example network environment (400) that includes a server (490), three client devices (410, 420, 430) and a network (480). The network (480) represents the Internet, a wide-area network, a local-area network or any other network. In FIG. 4, the server (490) interacts with the three client devices (410, 420, 430) over the network (480) for query processing.

The server (490) hosts a database management system ("DBMS") (492), which can include or access a search tool module (493) at the server (490). The DBMS (492) mediates interactions between a database and clients in order to organize, create, update, capture, analyze and otherwise manage the data in a database. The DBMS (492) can be a relational DBMS ("RDBMS") such as a SAP HANA RDBMS, another in-memory RDBMS, a Postgres DBMS, another object-relational DBMS or some other type of DBMS. Although FIG. 4 shows a single server (490) hosting the DBMS (492) and search tool module (493), in practice the DBMS (492) can manage multiple servers across which data for a database is partitioned. The data can be stored in multiple database tables for an ERP system, and can represent data values used for product planning, cost tracking and development, manufacturing, service delivery, marketing, sales, inventory management, shipping and payment tracking. In some configurations, the server (490) incorporates innovations for on-the-fly determination of search areas and/or queries for database searches.

Each of the client devices (410, 420, 430) includes a database client (412, 422, 432). The database client (412, 422, 432) includes or accesses a search tool module (413, 423, 433) at the client device (410, 420, 430). With a search tool module (413, 423, 433), a database client (412, 422, 432) retrieves, according to search criteria, data stored in the database managed by the DBMS (492) at the server (490) or another DBMS, and presents the data. A client device (410, 420, 430) can also include other software for creating, deleting, editing or otherwise managing data in the database. Although FIG. 4 shows three client devices (410, 420, 430), alternatively, the network environment (400) can include more or fewer client devices.

A user provides input to a client-side search tool module (413, 423, 433) to specify a search string or search area, and the user can view and interact with visualizations of data presented by the database client (412, 422, 432) or search tool module (413, 423, 433). The search tool module (413, 423, 433) or database client (412, 422, 432) provides input from the user to the search tool module (493) at the server (490) through the network (480). The input can include input specifying a search string and/or input specifying a search area. For input specifying a search area, the search tool module (493) determines any target tables of the database that fit the input for the search area. The search tool module (493) can return information about the target table(s) to the client device (410, 420, 430). For input specifying a search string, the search tool module (493) constructs a query based on the input. The query can be written in SQL or some other query language. After execution of the query, the search tool module (493) can return results of the query to the client device (410, 420, 430).

In the example of FIG. 4, a database client (412) or client-side search tool module (413) provides input for a search string (414) through the network (480) to the search tool module (493) at the server (490), which constructs a query, executes the query and returns a result set (418) through the network (480) to the database client (412)/search tool module (413). The database client (412) or search tool module (413) then presents the query results. Another database client (432) or client-side search tool module (433) provides input for a search area (436) and input for a search string (434) through the network (480) to the search tool module (493) at the server (490). The search tool module (493) determines any target tables of the database that fit the input for the search area (436). The search tool module (493) can return information about the target table(s) to the database client (432)/search tool module (433). From the input for the search string (434), the search tool (493) constructs a query, executes the query and returns a result set (438) through the network (480) to the database client (432)/search tool module (433). The database client (432) or search tool module (433) then presents the query results.

In the preceding examples, the search tool module (493) at the server (490) determines search areas on-the-fly based on search area input, constructs queries based on search string input, and executes the queries for database searches. Alternatively, at least some of this functionality can be implemented in a search tool module (413, 423, 433) at one of the client devices (410, 420, 430). That is, a search tool module (413, 423, 433) at a client device (410, 420, 430) incorporates innovations for on-the-fly determination of search areas and/or queries for database searches.

For example, a search tool module (413, 423, 433) at one of the client devices (410, 420, 430) can determine which database tables to include in a search area based on search area input provided by a user and based on information provided by the DBMS (492). The client-side search tool module (413, 423, 433) uses information about database tables in the database (such as table names, description text for the database tables and/or data definition information for fields) to determine which database tables to use for a database search.

As another example, instead of a search tool module (493) at the server (490) constructing queries based on search string input, a search tool module (413, 423, 433) at one of the client devices (410, 420, 430) constructs the queries. The queries are then provided to the search tool module (493) at the server (490) for execution.

III. Example Approaches to Organizing Database Records.

Historically, most DBMSs have implemented record-oriented storage of data in a database. A database that uses record-oriented storage is a row-store database. In a row-store database, the values of a tuple (set of elements) in a database relation are stored contiguously in storage or memory. For example, a table of an example database includes records for employees (in rows), where each record includes values for employee number, department, office and citizenship. In a row-store database, values for employee number, department, office and citizenship are stored contiguously for the first employee, then values for employee number, department, office and citizenship are stored contiguously for the second employee, and so on. Record-oriented storage is efficient when inserting a new record or selecting a whole record, since all values of the record can be written or read at once. Operations that involve aggregating values in a single column are not efficient, however, since most values are skipped for records in the row-oriented storage.

Therefore, some DBMSs have implemented column-oriented storage of data in a database. A database that uses column-oriented storage is a column-store database. A column-store database can include one or more tables. In a column-store database, a table of data is partitioned into separate columns, and the values of each column are stored contiguously in storage or memory. The columns of a table typically have the same length (number of records, or rows). For example, in a column-store database, values for employee number are stored contiguously for all records (rows), then values for department are stored contiguously for all records, and so on. The columns are independent, in that a column does not necessarily have to be written directly after the column that precedes it in the table. Column-oriented storage is efficient when aggregating values in a single column. Column-oriented storage also facilitates compression. A sequence of values in one column can usually be compressed more efficiently than a sequence of values for a record. On the other hand, inserting a new record or selecting a whole record in a column-store database involves writing or reading values in multiple columns, which can be inefficient.

To speed up operations that read data from a column-store database, a DBMS can keep column data in main memory. An in-memory database keeps data in main memory, with backups of the data stored in storage (e.g., disk storage). For example, an in-memory column-store database keeps column data in memory. In contrast, a disk-resident database keeps data in storage, and parts of the data are cached in main memory.

Within a column in a database table, values may repeat. In many cases, the number of distinct values in a column is smaller than the number of rows in the table. To reduce how much memory is used to store column data, a DBMS can represent the set of distinct values in a dictionary, which is an auxiliary data structure that maps value identifiers ("value IDs") to distinct values. The value IDs are usually integers. If the distinct values are strings, the dictionary is called a string dictionary. Typically, the distinct values in a dictionary are sorted in ascending order. In the database, values in a column are replaced with value IDs that represent those values. This process is sometimes called domain encoding or domain coding. Thus, a column of values is replaced with a column vector (of value IDs) and a dictionary that maps value IDs to distinct values.

If the initial values of a column consume more space than the column vector and dictionary for the column, using the column vector and dictionary achieves compression. In particular, this is a common scenario for columns of string values. Domain encoding has several other advantages. For example, searching for the occurrence of a value in a column can be performed using integer comparisons on the value IDs of the column vector. Integer comparisons are usually faster than string comparisons. As another example, when the dictionary is sorted in ascending order, range queries can be performed efficiently.

IV. On-the-Fly Determination of Search Area.

This section describes innovations in the area of determining search areas for database searches. In general, a user provides input (e.g., a string such as "line item" or "customer name") related to the user's search, and a search tool uses the input to determine which database tables to include in the search area for the search. The search tool can consider various sources of information when determining which database tables to include in the search area. For example, the search tool can consider names, descriptions and/or field definitions for the database tables. Depending on the information the search tool considers, database tables that fit the input from the user are included in the search area. Thus, the search area is determined using current information about database tables in a database (e.g., names, descriptions and/or field definitions for the database tables), so the search area is up-to-date. Even if the structure of a database table changes, the search area reflects the change in the next search.

For a database search within the search area, the search tool can also receive and process input that specifies a search string. The search tool constructs queries to search for the search string input in the database tables in the search area, taking account of the formats of the fields of the database tables. As needed, the search tool can convert a search value from its input format to the format of a field of a database table in the search area. For example, the search tool applies a conversion routine to the search value.

In some example implementations, the database tables are part of a column-store database (see section III), for which different fields of a database table correspond to different columns in the column-store database. This facilitates fast searching of a database table in a search area, using the column-store dictionaries for the respective fields of the table. The fast search capabilities help the search tool return real-time status information for the database after performing actual searches on relevant database tables in the search area.

The real-time search capabilities of the search tool can be used in various business scenarios. For example, the search tool can be used to identify all customer data for a particular customer. With prior approaches using an index file, some customer data may be missed if the index file is incomplete or out-of-date. As another example, the real-time search capabilities of the search tool can be used to match a payment amount to possible items for that payment. Or, system landscape optimization can use the search tool (e.g., to find an object in order to rename it). More generally, the search tool can be used for any arbitrary search within an ERP system or other system.

A. Searching in a Search Area Determined On-the-Fly.

FIG. 5 illustrates a search process (500) for database tables (505) in a search area (525) determined on-the-fly. A search tool such as a server-side search tool module described with reference to FIG. 4 can perform the process (500). Or, a search tool implemented using a client-side search tool module and server-side search tool module working together (as described with reference to FIG. 4) can perform the process (500).

A user provides input for a search string and also provides input for a search area. The search tool receives (510) the input for the search string and search area.

The search tool processes the input that specifies the search area. Based on the search area input, the search tool searches (520) description information (515) for the database tables (505) of the database. The description information (515) can include, for example, names of the database tables (505), text descriptions of the database tables (505) and/or data definition information for fields (names, data element definitions, formats, etc.) of the database tables (505). Using the description information (515), the search tool identifies database tables that fit the input for the search area (that is, identifies the "target tables" (525) in FIG. 5). For a given database table among the database tables (505), the search tool can (1) check if the name of the given database table fits the input for the search area (e.g., name matches or contains the search area string), (2) check if the text description of the given database table fits the input for the search area (e.g., text description contains the search area string), and/or (3) check if the description of any field of the given database table fits the input for the search area (e.g., name, data element definition, text description, etc. for a field contains the search area string).

The user can also directly specify one or more database tables to include in the search area. For example, the user inputs the exact names of database tables from a table selection interface. If the user does not provide any input for the search area, all database tables of the database are searched.

The search tool can return (530) identifiers of target tables (525). With this information, the target tables (525) in the search area can be presented to the user.

For the database search, the search tool constructs (540) one or more queries for the search string input provided by the user. This can entail multiple stages of processing, including creation of a field catalog, format conversion for the search string input and generation of queries (in particular, the conditions used in queries), before execution of the queries to actually search (550) the target tables in the search area for the search string. In practice, the target tables (525) in the search area can be searched sequentially. Or, the target tables (525) in the search area can be searched in parallel for at least some of the target tables (525). Searching target tables (525) in parallel tends to speed up the search process but also use more computing resources. In some implementations, a user can specify how many target tables to evaluate in parallel or how much of a computing resource to devote to the search process, so as to trade off resource usage and search speed.

For a given target table, the search tool interprets the data definition information for the table (including details about names, data element definitions, formats, etc. for fields of the table) and creates a field catalog for the fields to be searched. The field catalog indicates the structure of the fields of the target table.

The search tool uses the field catalog to selectively convert search string input to other formats. In particular, for a field of the given target table, the search tool can selectively convert a search value of the input to the format of the field. For example, a search value of the search string is converted to the format of the field if (1) the format of the search value is different than the format of the field and (2) the search value can be converted to the format of the field. Some conversions are not possible, e.g., character to number. As such, some fields of the given target table are not searched for the search value. The search tool can use conversion routines (so-called conversion exits) for the format conversion operations.

For example, suppose the search string input is 03292000. For a date field of the given target table, the search string input can be converted to the format 290300. For a character field of the table, the search string input can be converted to the string "03.29.2000." For an integer field, the search string input can be converted to the integer 3292000. For a currency field (in U.S. dollars), the search string input can be converted to $3292000.

The search tool constructs a query using the (possibly converted) search values of the search string input. The query can be a SELECT statement in a structured query language ("SQL"), for which the WHERE clause defines the condition for the query. For example, for one of the target tables (525) in the search area, the search tool generates a WHERE clause using the search values and the relevant fields of the target table. Because each of the target tables (525) may be defined differently, the specifics of each target table are taken into account when generating the query for that table. The search tool executes the query.

Search results can later be displayed per table. The search tool (or another module) interprets (560) the results (e.g., sorting results by number of hits, prioritizing results) and returns (570) the results to the requester for display. A hit can be presented in the context of surrounding details of the database table that includes the matching data value. For example, the matching data value can be highlighted in the display. Or, a list of database tables that include hits can be presented. Then, for a database table with one or more hits, a link can be followed to get more details about the locations/fields of the hit(s) within the database table. The search tool can use information about the structure of fields of a database table to provide contextual details for hits.

B. Techniques for Determining a Search Area for a Database Search.

FIG. 6*a* shows a generalized technique (601) for determining a search area for a database search. A search tool such as a client-side search tool module or server-side search tool module described with reference to FIG. 4, or other search tool, can perform the technique (601).

To start, the search tool receives (610) input for a search area for a database search. For example, the input is a character string provided in an input area of a user interface screen. Example user interface screens are shown in FIGS. 7 and 9. Alternatively, the input for the search area is provided in some other way.

For the database search, the search tool determines (630) one or more target tables that fit the input for the search area. The determination of target table(s) that fit the search area input can be based on: (1) names of multiple available database tables, (2) text descriptions of the multiple available database tables, and/or (3) data definitions for fields of the multiple available database tables. The target table(s) can include database tables having conventional definitions for an ERP system or other system. The target table(s) can also include a custom table defined by a user.

When determining target table(s) that fit the input for the search area, for a given database table of multiple available database tables, the search tool can check whether the input for the search area (1) fits the name of the database table (e.g., table name matches or includes the search area input); (2) fits text description for the database table (e.g., text description includes the search area input); and/or (3) fits, according to a data definition of the database table, any field text of fields of the table (e.g., name, data element definition, text description, etc. for a field contains the search area input). The data definition of the database table can indicate names and data formats of the fields, respectively, of the table, as well as text descriptions or definitions for the fields. In this way, the search tool can determine on-the-fly which database tables are relevant for the database search.

FIG. 6*b* shows a generalized technique (602) for constructing queries for a database search in a search area determined on-the-fly. A search tool such as a client-side search tool module or server-side search tool module described with reference to FIG. 4, or other search tool, can perform the technique (602).

To start, as described with reference to FIG. 6*a*, the search tool receives (610) input for a search area for a database search and determines (630) one or more target tables that fit the input for the search area.

In FIG. 6*b*, the search tool also constructs one or more queries the database search. The search tool receives (620) input for a search string for the database search. For example, the input is a character string provided in an input area of a user interface screen. Example user interface screens are shown in FIGS. 7 and 9. Alternatively, the input for the search string is provided in some other way.

The search tool constructs (640) one or more queries for the database search in the target table(s). The one or more queries can incorporate exact matching criterion (e.g., data value is the search string) or linguistic matching criterion (e.g., data value includes the search string).

When constructing a query for the database search, for a field of a given target table, the search tool can selectively convert a search value of the input for the search string to a data format of the field. For example, the search value of the input for the search string is converted to the data format of the field if (1) the data format of the search value is different than the data format of the field and (2) the search value can be converted to the data format of the field. (In some cases, the search value cannot be converted to the data format of the field, e.g., if the search value is a character string and the field is a number, time or date). Thus, the search tool can provide searching functionality that is easy to use, but still accounts for complex structures of database tables.

The input for the search string can include multiple search values. In this case, the search tool can construct queries as described in the next section. For example, the queries are SELECT statements in a SQL. Alternatively, the queries are constructed in another language. As described above, a query can be constructed in a table-specific way, such that the query accounts for formats of fields in a given target table.

After execution of the one or more queries, the results of the database search can be output for display. When output, an occurrence of the input for the search string in a given target table can be presented in context of surrounding details of the table. For example, the surrounding details and a link to the location of the occurrence in the table are presented. Since the target table(s) in the search area are determined on-the-fly and the target table(s) themselves are searched, the results of the database search indicate real-time status of the database.

The search tool can repeat the technique (601) shown in FIG. 6a or technique (602) shown in FIG. 6b on a search-by-search basis.

C. Detailed Examples of On-the-Fly Determination of Search Areas.

FIG. 7 shows a user interface screen (700) for providing input for a search area. A first area (710) of the user interface screen (700) presents options for the kind of search. The user can specify that the search tool should search for a string in a search area (e.g., using the technique (602) shown in FIG. 6b). Or, the user can specify that the search tool should only determine the search area (e.g., using the technique (601) shown in FIG. 6a).

A second area (720) of the user interface screen (700) provides an area for input of the search string. In FIG. 7, the search string is "MV0001." The second area (720) also presents options for the search criteria. The user can specify a linguistic search (data value includes a search value) or exact search (data value is the search value).

A third area (730) of the user interface screen (700) provides an area for input that specifies the search area. In FIG. 7, the input for the search area is "cost center." The third area (730) also presents options for the depth of the search when applying the search area input to determine target tables. The options include the search tool checking table names, checking table text (text description about database tables) and/or checking table field text (data definition information for fields). In general, selecting more options causes the search tool to find more target tables. Using the selected option(s) (options 1 and 2 in FIG. 7), the search tool finds database tables that fit the input text "cost center," and the search tool includes such target tables in the search area. Another option (not shown) can allow the user to directly specify a database table or set of database tables to include in the search area.

In general, providing detailed search area input results in a more focused set of target tables in the search area. Providing broader search area input results in a larger set of target tables in the search area. In any case, the search tool accesses the current table names, text description and/or data definition information for the database tables (depending on search options selected). The search tool evaluates all of the database tables in the database, including custom tables defined by users. If no search area input is provided, all database tables qualify as target tables in the search area.

A fourth area (740) of the user interface screen (700) provides options for display of results. The user can specify the search tool should determine table size. The user can also specify the search tool should display only target tables with hits (when search results are displayed).

FIG. 8 illustrates results (800) of the search tool determining database tables that fit the search area input in the example of FIG. 7. For each of the database tables, the search tool checks if the name of the database table fits the search area input (e.g., the table name matches or includes the string "cost center") and also checks if text description for the database table fits the search area input (e.g., the text description includes the string "cost center").

The results (800) show the number of database tables—48—that fit the search area input "cost center" and hence qualify as target tables in the search area. The results (800) also show the number of hits—5—for the search string "MV0001" in the search area. The target tables in the search area are presented in a chart (810), which includes columns for table name, description and number of hits. In the chart (810), target tables are ordered according to number of hits per target table. Some target tables fit the search area input but do not include the search string "MV0001." As explained with reference to the fourth area (740) of the user interface screen (700) of FIG. 7, display of target tables without hits can be suppressed, such that only tables with hits are displayed. A user can cause additional details for a database table in the chart (810) to be displayed by clicking on the table name.

FIG. 9 shows another user interface screen (900) for providing input for a search area. The areas (910, 920, 930, 940) of the user interface screen (900) operate as described with reference to corresponding areas of the user interface screen (700) of FIG. 7. In FIG. 9, however, the search string input is "Kessler" and the search area input is "UNAME." Also, an additional option for depth of the search area search is selected. Using the selected option(s) (options 1, 2 and 3 in FIG. 9), the search tool finds database tables that fit the input text "UNAME," and it includes such target tables in the search area.

FIG. 10 illustrates results (1000) of the search tool determining database tables that fit the search area input in the example of FIG. 9. The results (1000) show the number of database tables—1484—that fit the search area input "UNAME" and hence qualify as target tables in the search area. The results (1000) also show the number of hits—1225—for the search string "Kessler" in the search area. The target tables in the search area are presented in a chart (1010), ordered according to number of hits per target table. Many target tables have multiple hits. Other target tables fit the search area input but do not include the search string "Kessler."

FIGS. 11a-11c illustrate options for finding database tables that fit input for a search area. In these figures, the variable ld_input represents the search area input. The search tool appends any target tables to the variable lt_tables. With the SELECT statement (1101) shown in FIG. 11a, the search tool determines which database tables have a name that fits the search area input (c~tabname LIKE @ld_input). With the SELECT statement (1102) shown in FIG. 11b, the search tool determines which database tables have a text description that fits the search area input (c~ddtext LIKE @ld_input). Finally, with the SELECT statement (1103) shown in FIG. 11c, the search tool determines which database tables have field text (of data definition information) that fits the search area input, which may be converted to another format for comparison:

(domname LIKE @ld_input_do
OR rollname LIKE @ld_input_re

OR fieldname LIKE @ld_input_fi
OR scrtext_s LIKE @ld_input_s
OR scrtext_m LIKE @ld_input_m
OR scrtext_l LIKE @ld_input_l
OR reptext LIKE @ld_input_r
OR fieldtext LIKE @ld_input_f)

FIG. 11d shows a database search in the search area defined in the example of FIGS. 11a-11c. The target tables in the search area are listed in the variable lt_tables. In the code listing (1104), the search tool iterates through the target tables in lt_tables. For a given target table, the search tool searches for the search string using the field definitions of the target table. For each of the fields of the target table, the search tool checks whether the search string can possibly fit the field and, if so, converts the search string to the format of the field (if the search string not already in that format). The search tool constructs a WHERE condition lt_where for the search values and relevant fields of the target table. The search tool constructs a SELECT statement—SELECT COUNT(*) FROM (ls_tables~tabname) INTO ls_tables~count WHERE (lt_where)—and executes the query.

The text description for a table can be provided in multiple languages. For example, FIG. 12 shows text description (1200) for a table CSKS in multiple languages. The text description includes short descriptions in seven languages, which can be considered when checking whether text description for the database table fits search area input.

Similarly, the data definition information for a database table (with names, data element definitions, text descriptions, etc. for fields) can be provided in multiple languages. For example, the data definition information for a database table includes field names, metadata about fields, and text descriptions for all of the fields of the database table in multiple languages. Such information can be considered when checking whether any field text for fields of the database table fits search area input.

V. Handling Multiple Search Values for Database Tables.

This section describes innovations in the area of determining queries for database searches. In general, a user provides input for a search string for a database search, and a search tool constructs one or more queries from the search string input. The search string input can include multiple search values. If so, the user can specify whether the search tool should search for all search values (AND) in a database table or for any of the search values (OR) in the database table. Also, the user can specify whether the search tool should search for an exact match (data value is the search string/search value) or linguistic match (data value includes the search string/search value). With the search string input and settings, the search tool can construct one or more queries for the database search.

After a search area has been found (see section IV), or without specification of a search area, a set of database tables is available. For a database table, the search tool generates a query (e.g., SELECT statement in SQL), taking account of the formats of the fields of the database table. As needed, the search tool can convert a search value from its input format to the format of a field of the database table. For example, the search tool applies a conversion routine to the search value. Even if the structure of a database table changes, for the next search, the query reflects the change.

In some example implementations, the database tables are part of a column-store database (see section III), for which different fields of a database table correspond to different columns in the column-store database. This facilitates fast searching of a database table using the column-store dictionaries for the respective fields of the table. The fast search capabilities can help a search tool return real-time status information for a database after performing actual searches of fields of database tables using queries generated from search string input and details about the structure of the database tables.

A. Query Generation from Multiple Search Values.

For a database search, the search tool searches database tables for search string input provided by the user. This can entail multiple stages of processing, including creation of a field catalog, format conversion for the search string input, and generation of queries (in particular, the conditions used in queries), before execution of the queries. Database tables can be searched sequentially. Or, the database tables can be searched in parallel for at least some of the database tables. Searching database tables in parallel tends to speed up the search process but also use more computing resources. In some implementations, a user can specify how many database tables to evaluate in parallel or how much of a computing resource to devote to the search process, so as to trade off resource usage and search speed.

For a given database table, the search tool interprets the data definition of the table (including details about names, data element definitions, formats, etc. for fields of the table) and creates a field catalog for the fields to be searched. The field catalog indicates the structure of the fields of the database table.

The search tool uses the field catalog to selectively convert search string input to other formats. Potentially, the search string input can be converted differently for every field of a database table. For a given field of a database table, the search tool can selectively convert a search value of the input to the data format of the given field. For example, a search value of the search string is converted to the data format of the given field if (1) the data format of the search value is different than the data format of the given field and (2) the search value can be converted to the data format of the given field. Some conversions are not possible, e.g., character to number, date or time. As such, some fields of a database table might not be searched for a search value. The search tool can use conversion routines (so-called conversion exits) for the format conversion operations.

The search tool then generates a query using the (possibly converted) search values of the search string input. The query can be a SELECT statement in a SQL, for which the WHERE clause defines the condition for the SELECT statement. For example, for one of the database tables, the search tool generates a WHERE clause using the search values and the details about relevant fields of the database table. To determine the WHERE clause, the search tool generates one or more internal structures (examples provided below) to construct an AND condition or OR condition for the search values and fields to be searched. The comparisons in the WHERE clause can depend on whether the search tool performs an exact search or linguistic search. For an exact search, the search tool checks whether any value in a given field equals the search value. For a linguistic search, for at least some data types such as strings, the search tool checks whether any value in the given field equals or includes the search value.

Because each of the database tables may be defined differently, the specifics of each database table are taken into account when generating a query for that table (e.g., when constructing the WHERE clause for a SELECT statement for the database table). When a database table is added or the structure of a database table changes, the query construction adjusts the query for that database table accordingly.

Because it uses current data definition information for database tables during query construction, the search process is up-to-date.

B. Techniques for Generating Queries for Multiple Search Values.

FIG. 13 shows a generalized technique (1300) for constructing queries with multiple search values for a database search. A search tool such as a client-side search tool module or server-side search tool module described with reference to FIG. 4, or other search tool, can perform the technique (1300).

To start, the search tool receives (1310) input for a search string for a database search, where the input for the search string includes multiple search values. For example, the input is a character string provided in an input area of a user interface screen. Example user interface screens are shown in FIGS. 14 and 17. Alternatively, the input for the search area is provided in some other way.

The search tool constructs (1320) an OR query that includes a condition satisfied if any of the multiple search values is found in a database table and/or an AND query that includes a condition satisfied if all of the multiple search values are found in the database table. For example, the search tool constructs only an OR query for the database table. Or, the search tool constructs only an AND query for the database table. Or, the search tool constructs both an OR query and an AND query for the database table. In some example implementations, the query constructed by the search tool is a SELECT statement in SQL, and the AND or OR condition is reflected in the WHERE clause of the SELECT statement. Alternatively, the search tool constructs the query in another language.

A query can be constructed in a table-specific way, such that the query accounts for formats of fields in a given database table. When constructing a query, for a given field of the database table, the search tool can selectively convert one or more of the search values to the data format of the given field. For example, a given search value is converted to the data format of the given field if (1) the data format of the given search value is different than the data format of the given field and (2) the given search value can be converted to the data format of the given field.

The query can incorporate exact matching criterion or linguistic matching criterion in the comparison operations for the query. For an exact search, a query condition is whether a value in a given field equals the search value. For a linguistic search, for at least some data types such as strings, a query condition is whether a value in the given field equals or includes the search value.

After constructing the one or more queries for the database table, the search tool then searches the database table using the one or more constructed queries. The search tool can repeat the constructing (1320) and searching for each of one or more other database tables. In this way, the search tool can search for combinations of arbitrary search values (with an AND query and/or an OR query) in arbitrary fields of any of a set of database tables.

The input for the search string can also include, for each of at least one of the multiple search values, information indicating one or more fields of the database table to be searched for that search value. In this case, a constructed query accounts for any fields that are specified for the multiple search values, respectively, by further limiting which fields are searched for those search values.

The search tool can repeat the technique (1300) shown in FIG. 13 on a search-by-search basis.

C. Detailed Examples of Query Construction.

FIG. 14 shows a user interface screen (1400) for providing input for a search string with multiple search values. The first, third and fourth areas (1410, 1430, 1440) of the user interface screen (1400) operate as described with reference to corresponding areas of the user interface screen (700) of FIG. 7.

The second area (1420) of the user interface screen (1400) provides an area for input of the search string. In FIG. 14, the search string is "Kessler 2014," which includes the two search values "Kessler" and "2014." The second area (1420) also presents options for the search criteria. The user can specify linguistic search (data value includes the search string) or exact search (data value is the search string). Also, the user can specify whether the search tool should search for all search values ("All string (AND)") or for any of the search values ("Min. one string (OR)"). In FIG. 14, the user specifies that the search condition is satisfied if a database table includes any of the search values ("Kessler" OR "2014").

Figure 15:
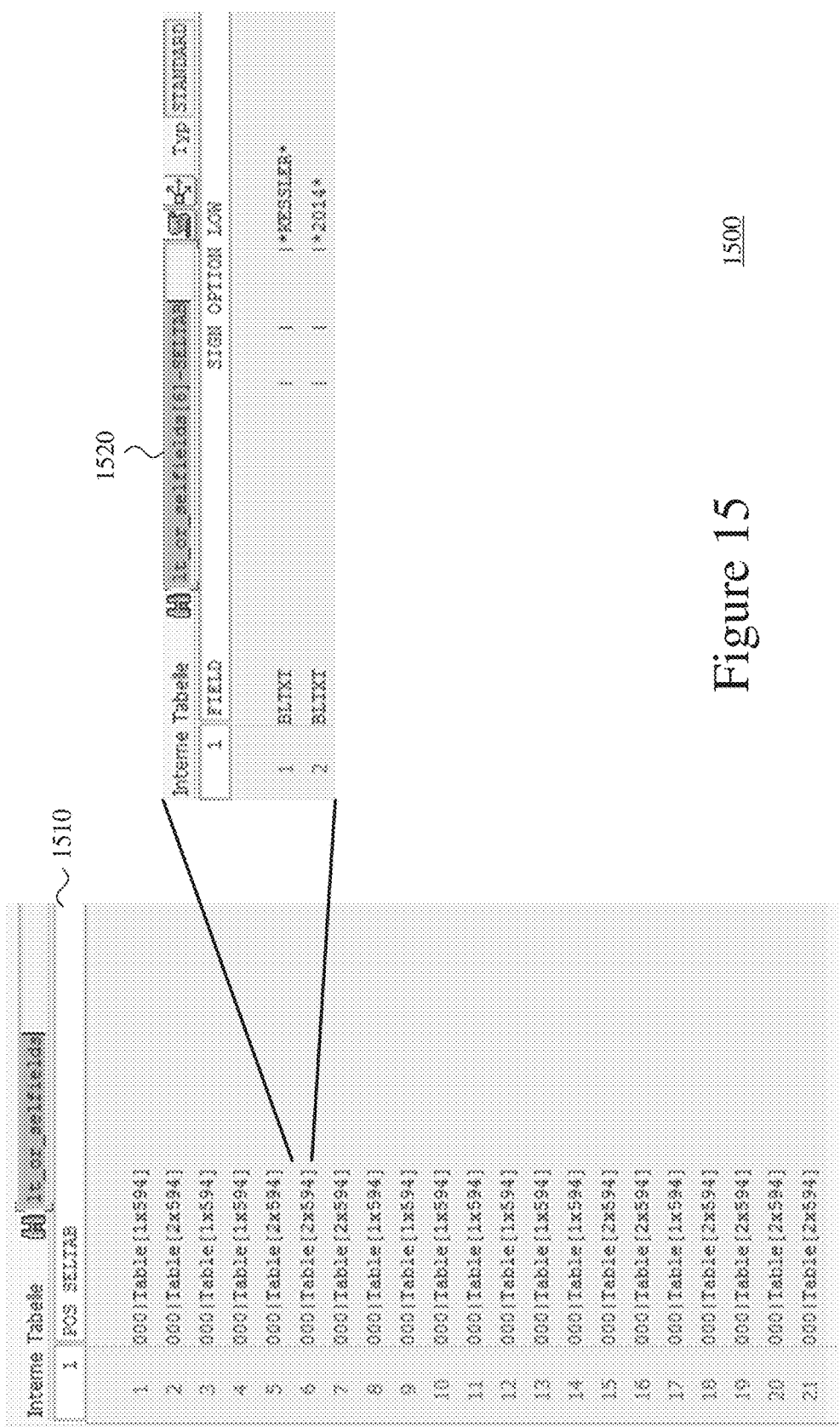
FIG. 15 is a diagram illustrating example data structures used when creating a query for the search values of FIG. 14.

FIG. 15 shows example data structures (1500) used when creating an OR query for the search values of FIG. 14. The lt_or_selfields structure (1510) stores information about fields of a given database table and the search values, which may be converted to a different format for a given field of the table. The lt_or_selfields structure (1510) includes a structure per field. The structure per field includes up to n entries, where n is the count of search values, depending on how many of the search values are searched for the field. In FIG. 15, the lt_or_selfields structure (1510) includes 21 structures for 21 fields, respectively, of the table. Some of the 21 structures include a single entry, while others include two entries. For example, the lt_or_selfields[6] structure (1520) includes two entries for search values checked for the BLTXT field. The first entry includes the search value *KESSLER* for the BLTXT field, and the second entry includes the search value *2014* for the BLTXT field.

Figure 16:
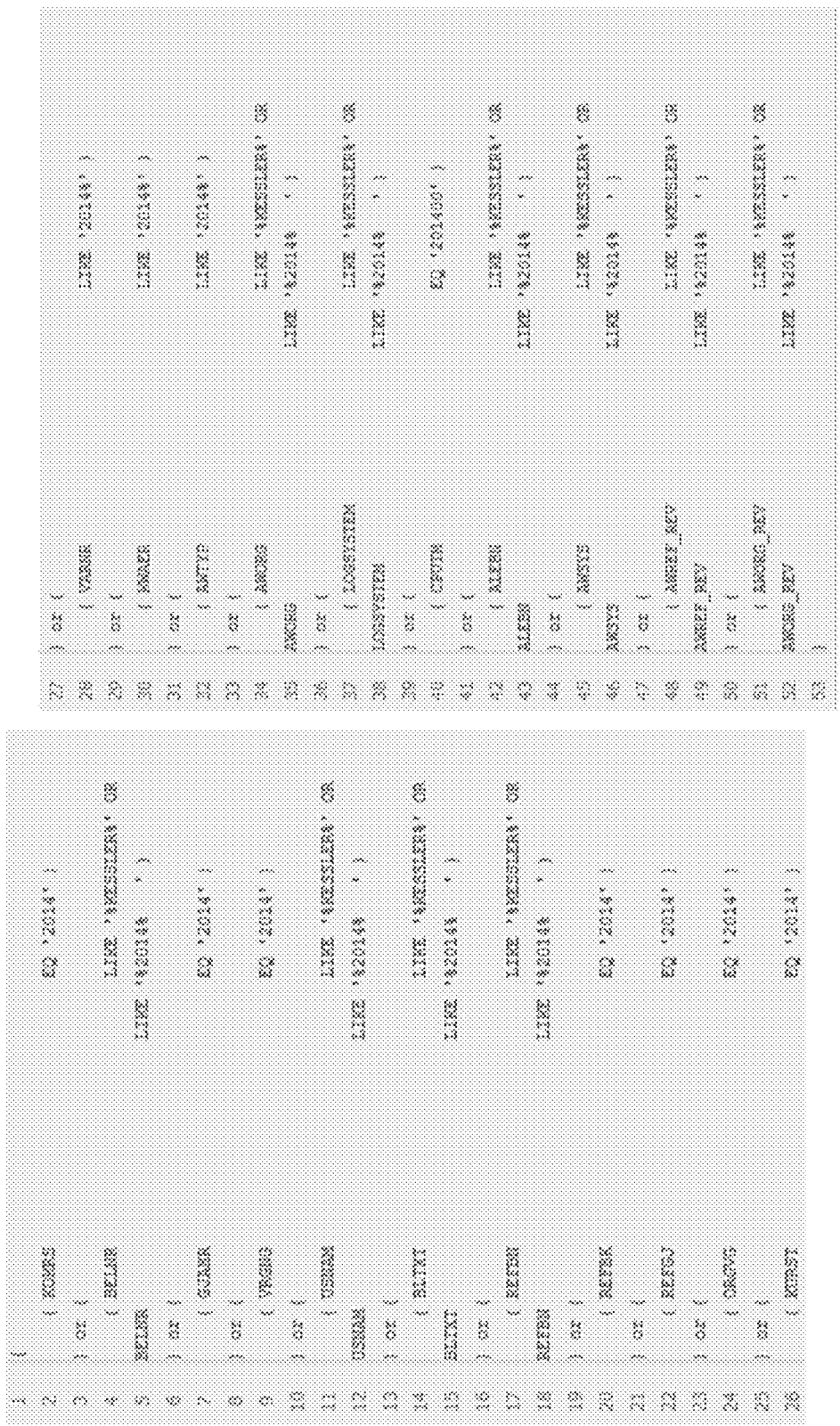
FIG. 16 is a pseudocode listing illustrating an example condition of a query for the search values of FIG. 14.

FIG. 16 shows an example condition (1600) of an OR query for the search values of FIG. 14 and data structures (1500) of FIG. 15. The condition (1600) includes 21 subconditions for the 21 fields, respectively, of the table. A sub-condition can check whether a search value equals (EQ operator) a data value in a field. Or, for a linguistic search, a sub-condition can check whether a search value is included in a data value in a field. The LIKE operator is used to search for a specified pattern in a field. The wildcard operator % is used to indicate a part of a search value that can be satisfied by any value, including null.

For example, the first sub-condition is whether any data value in the KOKRS field equals 2014. The search value "Kessler" is not evaluated for the KOKRS field, since it cannot be converted to the appropriate format. Similarly, only the search value 2014 is checked for the fields GJAHR, VRGNG, REFBK, REFGJ, ORGVG, KURST, VARNR, KWAER, AWTYP and CPUTM.

For the second sub-condition, the LIKE operator is used to search whether any data value in the field BELNR includes the pattern %KESSLER% or includes the pattern %2014%. Similarly, the patterns %KESSLER% and %2014% are checked for the fields USNAM, BLTXT, REFBN, AWORG, LOGSYSTEM, ALEBN, AWSYS, AWREF_REV and AWORG_REV.

The search tool can use a SELECT statement with the WHERE clause condition shown in FIG. 16 to search for the search values in the database table. The condition is satisfied if the table includes "Kessler" or "2014" in any field. By executing similar queries for other database tables in a database, the search tool can identify all database tables that contain "Kessler" or "2014."

FIG. 17 shows another user interface screen (1700) for providing input for a search string with multiple search values. The areas (1710, 1720, 1730, 1740) of the user interface screen (1700) operate as described with reference to corresponding areas of the user interface screen (1400) of FIG. 14. In FIG. 17, the search string is "Kessler 2014," which includes the two search values "Kessler" and "2014," and the user specifies that the search condition is satisfied if a database table includes all of the search values ("Kessler" AND "2014").

Figure 18A:
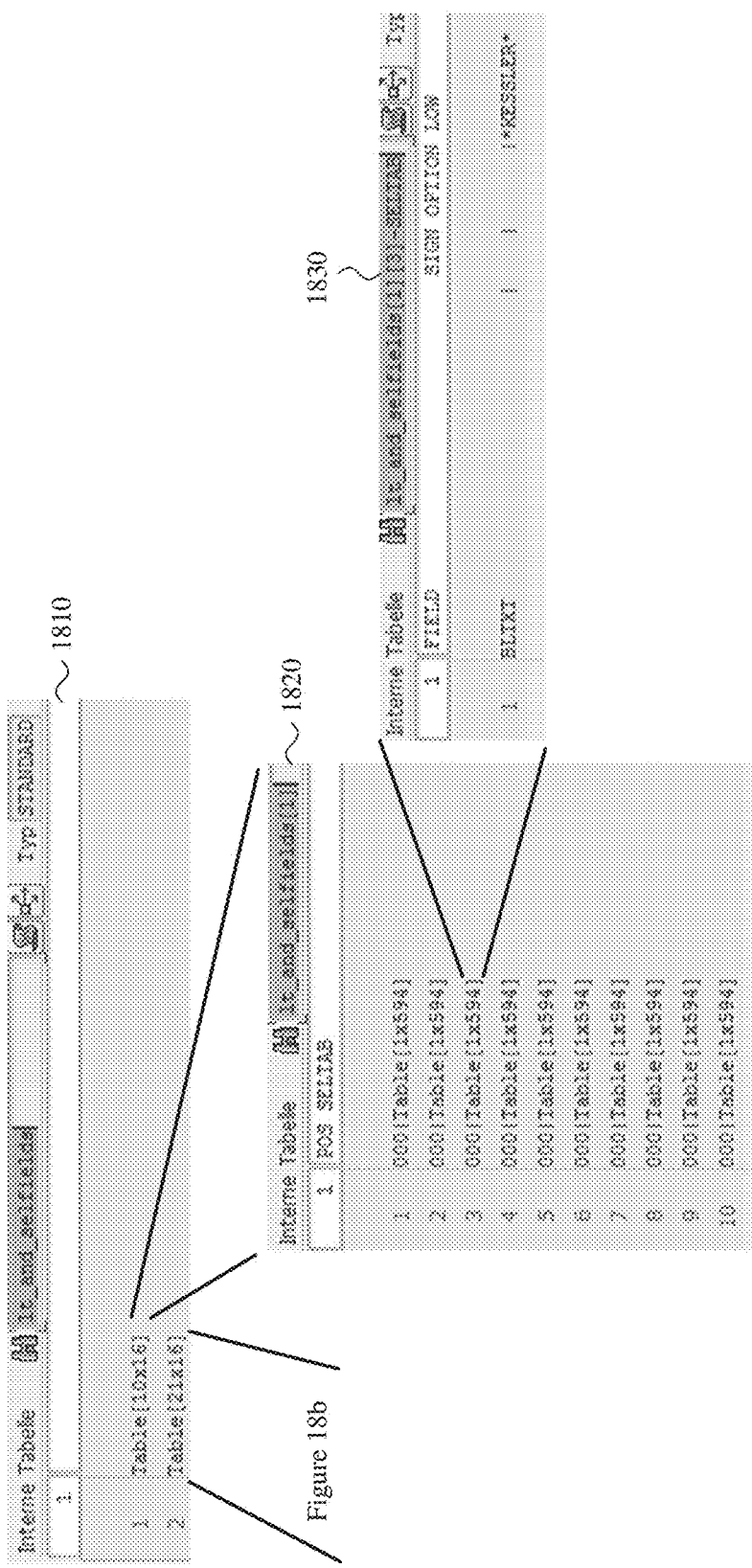
Figure 18B:
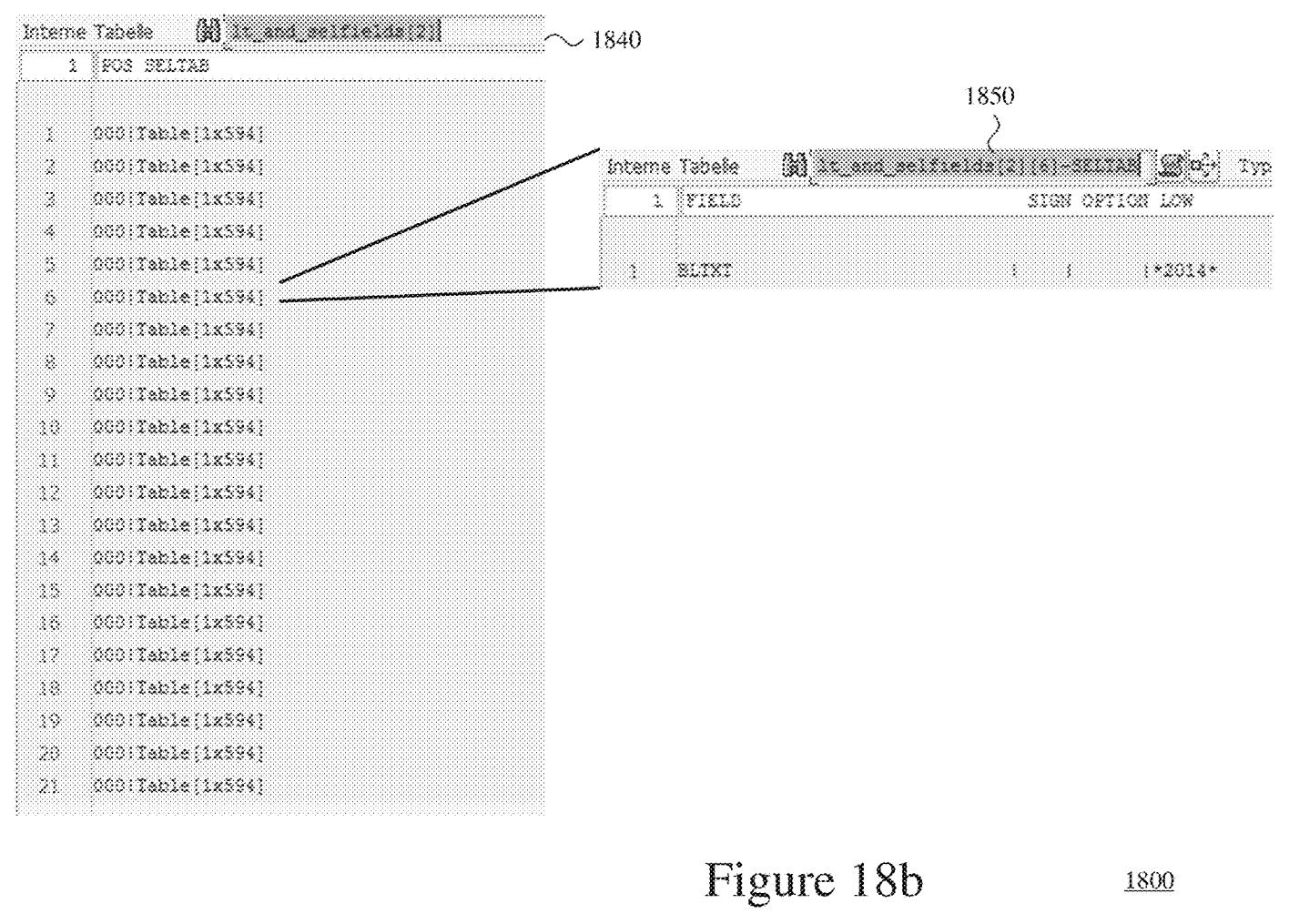

FIGS. 18a and 18b show example data structures (1800) used when creating an AND query for the search values of FIG. 17. The lt_and_selfields structure (1810) stores information about fields of a given database table and the search values, which may be converted to a different format for a given field of the table. The lt_and_selfields structure (1810) includes a structure per search value. Thus, the lt_and_selfields structure (1810) includes up to n structures, where n is the count of search values.

In FIG. 18a, for the search value "Kessler," the lt_and_selfields[1] structure (1820) includes 10 structures for 10 fields, respectively. Each of the 10 structures includes a single entry. For example, the lt_and_selfields[1][3] structure (1830) includes the search value *KESSLER* for the BLTXT field. In FIG. 18b, for the search value "2014," the lt_and_selfields[2] structure (1840) includes 21 structures for 21 fields, respectively. Each of the 21 structures includes a single entry. For example, the lt_and_selfields[2][6] structure (1850) includes the search value *2014* for the BLTXT field. More generally, the structure lt_and_selfields[n] for the $n^{th}$ search value includes up to f structures, where f is the number of fields in the table, depending on how many of the fields are searched for the $n^{th}$ search value.

Figure 19:
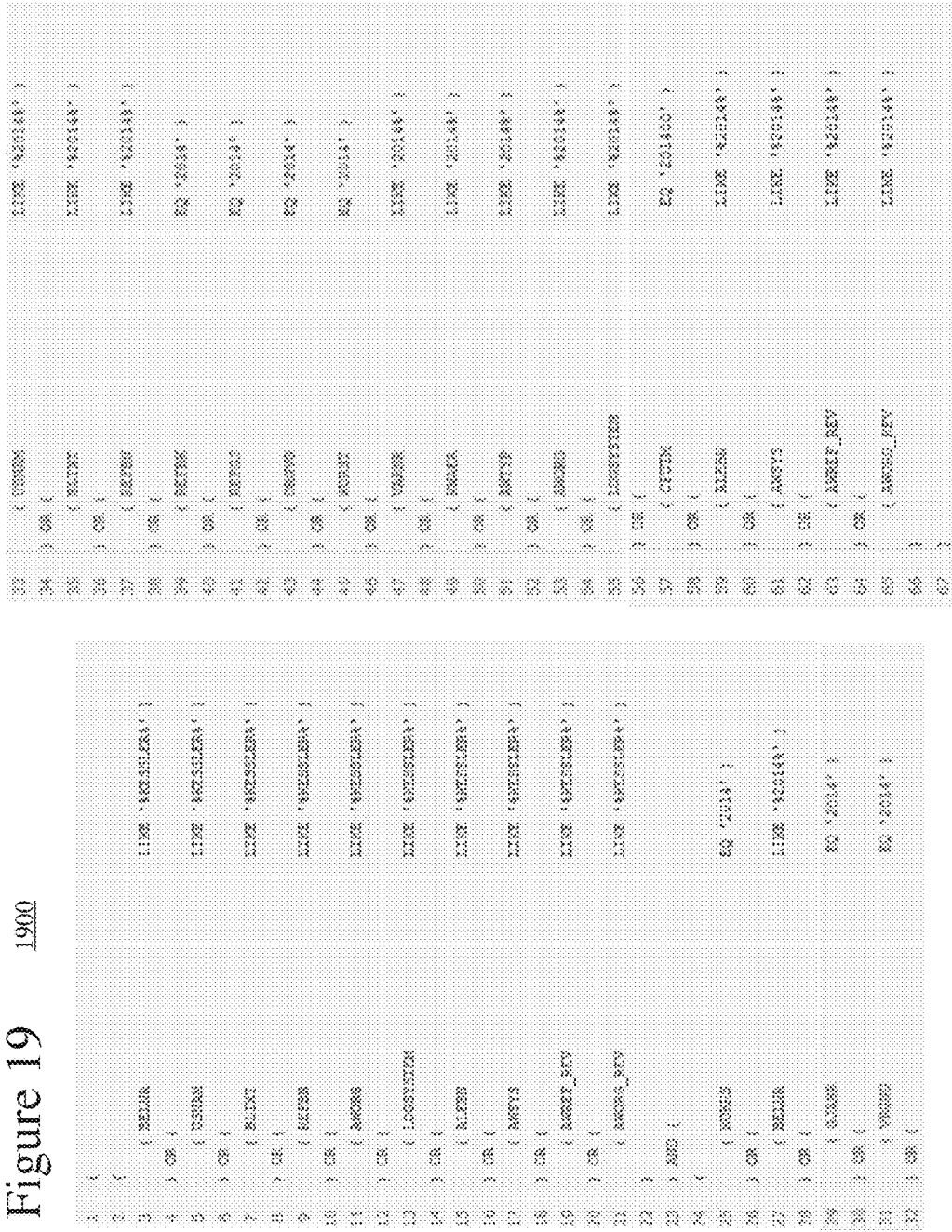
FIG. 19 is a pseudocode listing illustrating an example condition of a query for the search values of FIG. 17.

FIG. 19 shows an example condition (1900) of an AND query for the search values of FIG. 17 and data structures (1800) of FIGS. 18a and 18b. The condition (1900) includes two sub-conditions for the two search values ("Kessler" and "2014"). The two sub-conditions are connected by an AND operator.

The first sub-condition includes 10 sub-sub-conditions for the fields of the database table that are searched for the search value "KESSLER." For the first sub-sub-condition, the LIKE operator is used to search whether any data value in the field BELNR includes the pattern %KESSLER%. Similarly, the pattern %KESSLER% is checked for the fields USNAM, BLTXT, REFBN, AWORG, LOGSYSTEM, ALEBN, AWSYS, AWREF_REV and AWORG_REV. The first sub-condition is satisfied if the pattern %KESSLER% is part of any of the listed fields.

The second sub-condition includes 21 sub-sub-conditions for the fields of the database table that are searched for the search value "2014." The first sub-sub-condition is whether any data value in the KOKRS field equals 2014, and the second sub-sub-condition is whether any data value in the field BELNR includes the pattern %2014%. The remaining fields of the database table are similarly checked using an EQ operator or LIKE operator. The second sub-condition is satisfied if 2014 fits any of the listed fields.

The search tool can use a SELECT statement with the WHERE clause condition shown in FIG. 19 to search for the search values in the database table. The condition is satisfied if the table includes "Kessler" in any field and includes "2014" in any field. By executing similar queries for other database tables in a database, the search tool can identify all database tables that contain "Kessler" and "2014" in any of their fields.

FIG. 20 shows SQL instructions (2000) for looping through a set of database tables when performing a database search. The variable lt_tables lists the database tables to be searched. For a given database table, the variable lt_dfies contains data definition information for the database table. For the database table, the search tool can create a query with an AND condition and/or create a query with an OR condition.

FIG. 21a shows SQL instructions (2100) for creating an AND-WHERE clause for a SELECT statement. In FIG. 21a, the variable lt_input contains search string input provided by the user. The routine fill_selfields, which is detailed in the SQL instructions (2110) of FIG. 21b, selectively converts a search value to the format of a field, depending on the data definition information for that field. When creating the AND-WHERE clause, one search value at a time is processed with the routine fill_selfields. The lt_and_selfields structure, which is described with reference to FIGS. 18a and 18b, stores values used to create the AND-WHERE clause for the SELECT statement.

FIG. 21c shows SQL instructions (2120) for generating the AND-WHERE clause for the SELECT statement. The lt_and_selfields structure stores search values that have been converted, if needed, to other formats for fields of a database table. The function SE16N_CREATE_AND_SELTAB creates the AND-WHERE clause for the database table. For example, the function SE16N_CREATE_AND_SELTAB combines values of the lt_and_selfields structure using sub-conditions for the respective search values, with sub-sub-conditions for fields for a given search value, as illustrated in FIG. 19. The AND-WHERE clause is represented with the variable lt_where. The search tool executes the SELECT statement for the database table using the generated AND-WHERE clause, and stores results in an output list.

FIG. 22a shows SQL instructions (2200) for creating an OR-WHERE clause for a SELECT statement. In FIG. 22a, the variable lt_dfies contains data definition information for a database table. The routine fill_selfields, which is detailed in the SQL instructions (2110) of FIG. 21b, selectively converts search values to the format of a field, depending on the data definition information for that field. When creating the OR-WHERE clause, all search values together are processed with the routine fill_selfields. The lt_or_selfields structure, which is described with reference to FIG. 15, stores values used to create the OR-WHERE clause for the SELECT statement.

FIG. 22b shows SQL instructions (2210) for generating the OR-WHERE clause for the SELECT statement. The lt_or_selfields structure stores search values that have been converted, if needed, to other formats for fields of a database table. The function SE16N_CREATE_OR_SELTAB creates the OR-WHERE clause for the database table. For example, the function SE16N_CREATE_OR_SELTAB combines values of the lt_or_selfields structure using sub-conditions as illustrated in FIG. 16. The OR-WHERE clause is represented with the variable lt_where. The search tool executes the SELECT statement for the database table using the generated OR-WHERE clause, and stores results in an output list.

VI. Limiting Database Searches to Specified Fields.

FIG. 23 shows a user interface screen (2300) for providing input for a search string with multiple search values and corresponding fields for the search values. Four input areas of the user interface screen (2300)—labeled Search Value 1, Search Value 2, Search Value 3 and Search Value 4—provide areas for input of search values. Four other input areas of the user interface screen (2300)—labeled Field Description 1, Field Description 2, Field Description 3 and Field Description 4—provide areas for input of fields in which the search tool searches for the search values, respectively. In the example of FIG. 23, the search tool searches for the string "KS0001MV0001" in fields that fit the description "Object number." The search tool searches for the string "400001" in fields that fit the description "Cost element," and searches for the string "2014" in fields that fit the description "Fiscal year." The search tool searches for the string "RKIV" in fields that fit the description "Business transaction." If a field description is not provided for a search value, the search tool can search for the search value in any field, assuming format conversion is possible for the field.

When determining which database tables to include in a search area, the search tool identifies any of the database tables having at least one field that fits the specified field descriptions. Then, for each of the target tables in the search area, the search tool creates a query adapted for that database table. For each of the search values, the query checks whether any fields fitting the corresponding field description include the search value. The user need not know which target tables contain which relevant fields, as all combinations possible for a given target table are searched in the query.

FIG. 23 also shows search results (2310). The search results present table names, short descriptions, hits (counts of search value matches) and number of suitable entries for the database tables that have at least one field that fits the specified field descriptions. The number of suitable entries shows how many field descriptions are satisfied for the table. In the example of FIG. 23, seven tables have at least one field that fits the specified field descriptions. The seven tables are organized by number of suitable entries. If multiple target tables have the same number of suitable entries, those target tables are ranked by number of hits.

FIGS. 24a-24c shows fragments of example queries (2401, 2402, 2403) for the search values of FIG. 23. FIG. 24a shows part of an example query (2401) for the table COEP, which includes fields that fit all four field descriptions in the example of FIG. 23. The field KSTAR fits the field description "Cost element." The field GJAHR fits the field description "Fiscal year," and the field VRGNG fits the field description "Business transactions." Several fields—including USPOB, OBJNR_N3, OBJNR, OBJNR_N1, OBJNR_HK, PAROB1, PAROB and OBJNR_N2—fit the field description "Object Number." The search tool constructs an AND/OR-WHERE clause for the SELECT statement. As shown in FIG. 24a, for each combination of four fields that fit the four field descriptions, the search tool generates an AND sub-condition to check whether the search values are found in all four fields. More generally, for each field that fits a field description, taken alternatively, the search tool generates an AND sub-condition for each possible combination of that field and the other fields that fit the other field descriptions. The AND sub-conditions are connected by OR operators.

FIG. 24b shows part of an example query (2402) for the table COKA, which includes fields that fit three field descriptions in the example of FIG. 23. The field KSTAR fits the field description "Cost element." The field GJAHR fits the field description "Fiscal year," and the field OBJNR fits the field description "Object Number." The search tool constructs an AND-WHERE clause for the SELECT statement. As shown in FIG. 24b, for the combination of three fields that fit the field descriptions, the search tool generates an AND condition to check whether the search values are found in all three fields.

FIG. 24c shows part of an example query (2403) for the table FIEUD_FIDOC_1, which is even simpler than the query shown in FIG. 24b. The table includes a single field—GJAHR—that fits a field description. The search tool constructs a WHERE clause to check whether the search value 2014 is found in the field.

FIGS. 25a-25c show example data structures (2501, 2502, 2503) used when creating a query for the search values of FIG. 23 and the table COEP. FIG. 25a shows an ct_tables [90] structure (2501) that includes information for the COEP table. The ENTITY_NR field indicates the number of search fields (that is, how many field descriptions are satisfied for the table). The LT_OR structure stores the access strategy for the query. FIG. 25b shows the LT_OR structure (2502), which includes 8 structures for sub-conditions of the query. Each of the 8 structures includes four entries, which store the four search values shown in FIG. 23 and corresponding fields to be searched. FIG. 25c shows a structure (2503) for one of the sub-conditions, which stores values transformed into the first sub-condition shown in FIG. 24a.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A computer system comprising one or more processing units and at least one memory coupled to the one or more processing units, the computer system programmed to perform operations comprising:

receiving, through a graphical user interface, input from a user for a search area for a database search, the input for the search area including a search area string received from user input and comprising one or more key words;

converting the search area string into first query language operations, stored in the at least one memory, when executed by the one or more processing units, the first query language operations configured to identify one or more database tables of plural available database tables of a database, the plural available database tables associated with one or more respective data objects, stored in the at least one memory, storing description information for respective database tables, the identified database tables having one or more data objects storing description information matching at least a portion of the search area string;

executing the first query language operations, the executing comprising:

accessing the description information for the plural available database tables through respective data objects, the description information comprising, and stored in the respective one or more data objects, one or more of: (1) names of the plural available database tables, (2) text descriptions of the plural available database tables, and (3) data definitions for fields of the plural available database tables;

determining the one or more of the plural available database tables that have description information matching the at least a portion of the search area string by comparing, using the one or more processing units, the search area string, according to operations specified by the first query language operations, with the one or more data objects stored in the at least one memory, wherein identifying information for tables determined to have matching description information is appended to first query execution results;

generating first query execution results comprising the identifying information, retrieved from at least a portion of the one or more data objects stored in the at least one memory, of the determined one or more of the plural available tables;

receiving, through the graphical user interface, input, comprising one or more keywords, from the user for a search string to be executed only against at least a portion of the determined one or more of the plural available tables of the first query execution results, the at least a portion of the determined one or more of the plural available tables of the first query execution results being all of the one or more of the plural available tables of the first query execution results or a portion of the plural available tables of the first query execution results selected by a user through user input received through the graphical user interface;

converting the search string into second query language operations, stored in the at least one memory, when executed by the one or more processing units, the second query language operations configured to identify data stored in the at least a portion of the determined one or more of the plurality of available tables of the first query execution results having a relationship with the search string specified by at least a portion of the second query language operations;

executing the second query language operations to generate second query results the executing comprising:

for each table of the at least a portion of the first query execution results, each table having a plurality of fields, analyzing each field of the respective table to determine whether it can be searched to determine if values of the field have the specified relationship with the search string;

for fields that can be searched, searching the table for records having the specified relationship for the respective field; and adding at least a portion of records having the specified relationship to the second query results; and returning the second query results to the user.

2. The computer system of claim 1, wherein the determining comprises, for a given database table of the plural available database tables:

checking whether a name of the given database table in the description information contains the at least a portion of the search area string.

3. The computer system of claim 1, wherein the determining comprises, for a given database table of the plural available database tables:

checking whether a text description of the given database table in the description information contains the at least a portion of the search area string.

4. The computer system of claim 1, wherein the determining comprises, for a given database table of the plural available database tables:

checking whether, according to a data definition of the given database table in the description information, any field text of fields of the given database table in the description information contains the at least a portion of the search area string.

5. The computer system of claim 4, wherein the data definition of the given database table indicates names and data formats of the fields, respectively, of the given database table.

6. The computer system of claim 1, the operations further comprising:

for a given table of the determined one or more of the plural available tables of the first query execution results, using the description information to create a field catalog for fields of the given table, the field catalog indicating structure of the fields of the given table; and the constructing comprises, for one of the fields of the given table, using the field catalog to selectively convert a search value of the user input for the search string to a data format of the field, wherein the search value of the user input for the search string is converted to the data format of the field if (1) a data format of the search value is different than the data format of the field and (2) the search value can be converted to the data format of the field.

7. The computer system of claim 1, wherein the user input for the search string includes plural search values, and wherein the second query language operations comprise:

a condition satisfied if one or more of the plural search values is found in a given table of the determined one or more of the plural available tables.

8. The computer system of claim 1, the operations further comprising:

outputting for display the second query results, wherein an occurrence of at least a portion of the user input for the search string in a given table of the determined one or more of the plural available database tables is presented in context of surrounding details of the given table, and wherein the description information is used to determine the context of surrounding details of the given table.

9. The computer system of claim 1, wherein results of the database search indicate real-time status of the database.

10. The computer system of claim 1, wherein at least one of the determined one or more of the plural available tables is a custom table defined by a user.

11. The computer system of claim 1, wherein a single screen of the graphical user interface concurrently presents a display element for entering the search area string and a display element for entering the search string.

12. The computer system of claim 1, wherein the second query language operations are automatically executed after the determining.

13. The computer system of claim 1, wherein the second query results are presented to a user with description information for the at least a portion of the determined one or more of the plural available database tables.

14. The computer system of claim 13, wherein the second query results comprise identified data stored in the at least a portion of the plural available database tables.

15. The computer system of claim 13, wherein the second query results comprise a number of hits for each table for which description information is presented.

16. The computer system of claim 1, wherein the graphical user interface provides an option to only execute the first query.

17. The computer system of claim 1, wherein the user input for the search area string and the user input for the search string are received concurrently.

18. A computer system comprising one or more processing units and at least one memory coupled to the one or more processing units, the memory having stored therein computer-executable instructions for causing the computer system, when programmed thereby, to perform operations comprising:
- receiving, at a graphical user interface of a search tool implemented in the computer system, user input comprising one or more keywords for a search string for a database search;
- receiving, at the graphical user interface of the search tool implemented in the computer system, from a user, a user input, comprising one or more keywords, for a search area string;
- generating, at the search tool implemented in the computer system, a first query in a query language, the first query comprising at least a portion of the search area string;
- executing, at the search tool implemented in the computer system, the first query, the executing the first query comprising:
  - accessing, by the search tool implemented in the computer system, one or more data objects stored in the at least one memory, the one or more data objects storing description information for a plurality of database tables;
  - with the search tool implemented in the computer system, determining one or more tables of the plurality of database tables, the determined one or more tables responsive to the first query;
  - with the search tool implemented in the computer system, adding the determined one or more tables to first query execution results;
- with the search tool implemented in the computer system, constructing a second query that includes a condition satisfied if at least a portion of the search string is found in the determined one or more tables of the plurality of database tables of the first query execution results;
- executing the second query, the executing the second query comprising:
  - for each table of the at least a portion of the first query execution results, each table comprising a plurality of fields, analyzing each field of the respective table to determine whether it can be searched to determine if the at least a portion of the search string is found in the field;
  - for fields that can be searched, searching the table for records having the at least a portion of the search string in the respective field; and
  - adding at least a portion of records having the at least a portion of the search string to the second query results; and
- returning execution results of the second query to the user.

19. The computer system of claim 18, wherein the constructing comprises:
- for a field of a database table of the determined one or more tables of the plurality of database tables, using a field catalog to selectively convert the at least a portion of the search string to a data format of the field, wherein the at least a portion of the search string is converted to the data format of the field if (1) a data format of the at least a portion of the search string is different than the data format of the field and (2) the at least a portion of the search string can be converted to the data format of the field.

20. The computer system of claim 18, wherein the search area string is used to identify one or more fields of the plurality of database tables to be searched for the at least a portion of the search string.

21. The computer system of claim 20, wherein the second query is constructed to account for the identified one or more fields.

22. The computer system of claim 18, wherein the second query incorporates exact matching criterion or linguistic matching criterion.

23. In a computer system that comprises one or more processing units, memory, and storage, a method comprising:
- receiving, at a graphical user interface of a search tool implemented in the computer system, user input, comprising one or more keywords, for a search area for a database search, the input for the search area including a search area string;
- constructing, at the search tool implemented in the computer system, a first query that includes a first condition satisfied for any table of a plurality of tables where at least a portion of the search area string is found in description information for the table, the description information stored in one or more data objects stored in the memory;
- executing the first query, the executing comprising:
  - accessing, by the search tool implemented in the computer system, description information for the plurality of database tables and determining one or more tables of the plurality of tables that satisfy the first condition; and
  - with the search tool implemented in the computer system, searching for the at least a portion of the search area string in the description information to determine, for the database search, one or more tables of the plurality of tables that satisfy the first condition;
- receiving, at the graphical user interface of the search tool implemented in the computer system, user input, comprising one or more keywords, for a search string for the database search;
- with the search tool implemented in the computer system, constructing one or more second queries comprising at least a portion of the search string, the one or more second queries comprising a second condition satisfied if at least a portion of the search string is found in a table of the one or more tables of the plurality of tables that satisfy the first condition; and
- executing, with the search tool implemented in the computer system, the one or more second queries, the executing comprising determining one or more tables of the one or more tables of the plurality of tables that satisfy the first condition that satisfy the second condition the executing further comprising:
  - for each table of the one or more tables of the plurality of tables that satisfy the first condition, each table having a plurality of fields, analyzing each field of the respective table to determine if the field can be searched for the at least a portion of the search string;
  - for fields that can be searched for the at least a portion of the search string, searching the table for records having the at least a portion of the search string for a respective field; and adding at least a portion of records having the at least a portion of the search string to second query results; and returning the second query results to the user.

24. The method of claim 23 further comprising:

for a given table of the one or more tables of the plurality of tables that satisfy the first condition, using the description information to create a field catalog for fields of the given table, the field catalog indicating structure of the fields of the given table;

wherein the constructing comprises, for one of the fields of the given table, using the field catalog to selectively convert the at least a portion of the search string to a data format of the field, wherein the at least a portion of the search string is converted to the data format of the field if (1) a data format of the at least a portion of the search string is different than the data format of the field and (2) the at least a portion of the search string can be converted to the data format of the field.

25. The method of claim 23, wherein the searching comprises, for a given database table of the plurality of database tables:

checking whether a name of the given database table in the description information contains the at least a portion of the search area string;

checking whether a text description of the given database table in the description information contains the at least a portion of the search area string; or checking whether, according to a data definition of the given database table in the description information, any field text of fields of the given database table in the description information contains the at least a portion of the search area string.

26. The method of claim 23, wherein the computer system hosts a database client that includes or accesses the search tool, the method further comprising:

outputting for display results of the database search, wherein an occurrence of the at least a portion of the search string in a given table of the one or more tables of the plurality of tables that satisfy the first condition is presented in context of surrounding details of the given table, and wherein the description information is used to determine the context of surrounding details of the given table.

27. The method of claim 23, further comprising:

presenting, in a user interface screen, options for selecting the description information to which the first query will be applied, the options including: (1) names of the plurality of database tables, (2) text descriptions of the plurality of database tables, and (3) data definitions for fields of the plurality of database tables; and receiving user input indicating selection of one or more of the options.

* * * * *